(12) United States Patent
Dotzler et al.

(10) Patent No.: US 8,563,949 B2
(45) Date of Patent: Oct. 22, 2013

(54) FLUOROPEROVSKITE RADIATION DOSIMETERS AND STORAGE PHOSPHORS

(76) Inventors: Christian Josef Dotzler, Lower Hutt (NZ); Andrew Edgar, Wellington (NZ); Grant Victor McLelland Williams, Lower Hutt (NZ)

(*) Notice: Subject to any disclaimer, the term of this patent is extended or adjusted under 35 U.S.C. 154(b) by 377 days.

(21) Appl. No.: 12/452,490

(22) PCT Filed: Jul. 7, 2008

(86) PCT No.: PCT/NZ2008/000160
§ 371 (c)(1),
(2), (4) Date: Apr. 26, 2010

(87) PCT Pub. No.: WO2009/005377
PCT Pub. Date: Jan. 8, 2009

(65) Prior Publication Data
US 2010/0200741 A1    Aug. 12, 2010

Related U.S. Application Data

(60) Provisional application No. 60/929,626, filed on Jul. 5, 2007.

(51) Int. Cl.
*G03B 42/08* (2006.01)
(52) U.S. Cl.
USPC ................................................ 250/484.5
(58) Field of Classification Search
USPC ......... 250/252.1, 301.4 H, 484.5, 484.3, 337, 250/362
See application file for complete search history.

(56) References Cited

U.S. PATENT DOCUMENTS

| | | | |
|---|---|---|---|
| 3,506,584 A | 4/1970 | Held | |
| 3,859,527 A | 1/1975 | Luckey | |
| 5,028,509 A | 7/1991 | Shimada | |
| 5,166,456 A * | 11/1992 | Yoshino | 252/301.4 S |
| 5,549,843 A * | 8/1996 | Smith et al. | 252/301.4 H |
| 5,635,727 A | 6/1997 | Niimura | |
| 5,736,069 A | 4/1998 | Willems | |
| 6,583,434 B2 | 6/2003 | Struye | |
| 7,002,163 B2 | 2/2006 | Polf | |
| 7,141,794 B2 | 11/2006 | Srivastava | |
| 2001/0030302 A1 | 10/2001 | Struye | |
| 2005/0067586 A1* | 3/2005 | Yanagita et al. | 250/484.4 |
| 2005/0186329 A1* | 8/2005 | Tahon et al. | 427/65 |

FOREIGN PATENT DOCUMENTS

GB     1340322     12/1973

OTHER PUBLICATIONS

A.V. Gektin, "Scintillators and storage phosphors based on ABX3, crystals," Journal of Luminescence, 2000, 87-89, pp. 1283-1285.

(Continued)

*Primary Examiner* — Marcus Taningco
(74) *Attorney, Agent, or Firm* — Jacobson Holman PLLC

(57) ABSTRACT

This invention provides phosphor-doped fluoroperovskite compounds that are capable of storing at least part of the energy of incident ionizing radiation and releasing at least part of the stored energy upon optical stimulation or heating. Also provided are dosimeters and radiation storage devices comprising the compounds, methods of preparing the compounds, and methods of using the compounds to determine a dose of ionizing radiation or to record and reproduce an ionizing radiation image.

29 Claims, 9 Drawing Sheets

(56) References Cited

OTHER PUBLICATIONS

K. Somaiah et al., "Optically stimulated luminescence in Gd-doped fluoroperovskites for color center lasers," Proceedings of SPIE—The International Society for Optical Engineering, 1993, vol. 1985, Physical Concepts and Materials for Novel Optoelectronic Device Applications II, pp. 731-740.

G. Gambarini et al., "The perovskite-like KMgF3: A Promising thermoluminescent Material for Radiation Dosimetry," Electrochemical Society Proceedings—Luminescent Materials, 1998, vol. 97-29, pp. 89-99.

N. Kristianpoller et al., "Radiation Effects in KMgF3 Crystals," Radiation Effects & Defects in Solids, 2002, vol. 157, pp. 583-588.

W.A. Sibley et al., "Low-temperature radiation damage in Mn-doped RbMgF3," Journal of Physics C: Solid State Physics, 1977, vol. 10, No. 24, pp. 4909-4919.

D.K. Sardar et al., "Optical absorption and emission from irradiated Eu2+ ion-doped RbMgF3 and KMgF3," Journal of Luminscence, 1982, vol. 27, No. 4, pp. 401-411.

K. Tanimura et al., "Optical Properties of Cu+ ions in RBMgF3 crystals," Physical Review B: Condensed Matter and Materials Physics, 1985, vol. 31, No. 6, pp. 3980-3987.

E. Van de Kolk et al., "Luminscence excitation study of the higher energy states of Pr3+ and Mn2+in SrAlF5, CaALF5, and NaMgF3," Journal of Applied Physics, 2004, vol. 95, No. 12, pp. 7867-7872.

G. Kitis et al., "$KMgF_3$:Ce, an ultra-high sensitivity thermoluminescent material," Radiation Protection Dosimetry, 1999, vol. 82, No. 2, pp. 151-152.

A.V. Getkin et al., "UV-dosimetric material based on $KMgF_3$ perovskite," Radiation Measurements, 1998, vol. 29, No. 3-4;pp. 337-340.

G. Gambarini et al., "Thermoluminescent response of $KMgF_3$:Yb single crystals in gamma radiation fields," Radiation Protection Dosimetry, 1999, vol. 84, No. 1-4, pp. 211-214.

N. Kristianpoller et al., "Irradiation effects in perovskite-type fluorides," Radiation Effects, 1983, vol. 72, pp. 201-208.

C. Furetta et al., "Luminescence and dosimetric performance of $KMgF_3$ crystals doped with metal impurity ions," Radiation Protection Dosimetry, 1990, vol. 33, No. 1, pp. 107-110.

N.J.M. Le Masson et al., "Optically and thermally stimulated luminescence of $KMgF_3$:$Ce^{3+}$ and $NaMgF_3$:$Ce^{3+}$," Radiation Protection Dosimetry, 2002, vol. 100, Nos. 1-4, pp. 229-234.

G. Kitis et al., "Thermoluminescence properties of $KMgF_3$ doped with Pb, Cr and Ag," Radiation Protection Dosimetry, 1996, vol. 65, Nos. 1-4, pp. 93-96.

P.R. Gonzalez et al., "The thermoluminescent (TL) kinetics parameters of the perovskite-like $KMgF_3$ activated by lutetium impurities," Nuclear Instruments and Methods in Physics Research B, 2006, vol. 243, pp. 349-353.

N. V. Shiran et al., "Thermoluminescence of $KMgF_3$ (Re) crystals," Radiation Measurements, 1995, vol. 24, No. 4, pp. 435-437.

C. Bacci et al., "Photoluminescence and thermally stimulated luminescence in $KMgF_3$:$Eu^{2+}$ crystals," Radiation Protection Dosimetry, 1993, vol. 47, No. 1, pp. 277-280.

A.V. Gektin et al., "Radiation damage of pure and doped $KMgF_3$ crystals," IEEE Transactions on Nuclear Science, 1995, vol. 42, No. 4, pp. 311-314.

P.R. Gonzalez et al., "Thermoluminescence (TL) characterization of the perovskite-like $KMgF_3$, activated by Lu impurity," Journal of Material Science, 2004, vol. 39, pp. 1601-1607.

N. J. M. Le Masson et al., "Optically Stimulated Luminescence in $KMgF_3$ : $Ce^{3+}$ Comparison of Dosimetric Characteristics With $Al_2O_3$ : C," IEEE Transactions on Nuclear Science, 2001, vol. 48, No. 4, pp. 1143-1147.

C. Dotzler et al., "Dosimetry Properties of $NaMgF_3$ Doped With $Mn^{2+}$ and $Eu^{2+}$," $15^{th}$ International Conference on solid state dosimetry, Delft, Holland, Jul. 8-13, 2007, abstract submitted Jan. 15, 2007.

C. Dotzler et al., "Impurity-Doped Fluoroperovskites for Ionizing Radation and Solar UV Dosimetry," International Conference on materials for advanced technologies, Singapore, Jul. 1-6, 2007, abstract submitted Jan. 31, 2007.

C. Dotzler et al., "Impurity-doped Fluoroperovskites for Ionizing Radiation and Solar UV," Proceedings of the International Conference on Materials for Advanced Technologies, Singapore, Jul. 1-6, 2007, 8 pages.

C. Dotzler et al., "Radiation-Induced Optically and Thermally Stimulated Luminescence in $RbCdF_3$ and $RbMgF_3$," Current Applied Physics, 2008, vol. 8, pp. 447-450.

C. Dotzler et al., "Dosimetric properties of $RbCdF_3$:$Mn^{2+}$," Radiation Measurements, 2007, vol. 42, pp. 586-589.

C. Dotzler et al., "Thermoluminescence, photoluminescence and optically stimulated luminescence properties of x-ray irradiated $RbMgF_3$:$Mn^{2+}$," Physical Status Solidi C, 2007, vol. 4, No. 3, pp. 992-995.

C. Dotzler et al., "Optically Stimulated Luminescence of $NaMgF_3$:$Eu^{2+}$," Applied Physics Letters, 2007, vol. 91, pp. 121910-121910-3.

C. Dotzler et al., "Radiation-Induced Changes in the optical properties of Manganese doped Fluoroperovskites," Proceedings of the Australian Institute of Physics $17^{th}$ National Congress 2006 —Brisbane, Dec. 3-8, 2006.

C. Dotzler, "Optically Stimulated Luminescence in Fluoroperovskites for Dosimetric Applications," PhD thesis, 2008. Deposited in the Victoria University of Wellington Library May 15, 2008.

\* cited by examiner

FLUOROPEROVSKITE RADIATION DOSIMETERS AND STORAGE PHOSPHORS

CROSS-REFERENCE TO RELATED APPLICATIONS

The present patent application is a nationalization of International application No. PCT/NZ08/000,160, filed Jul. 7, 2008, published in English, which is based on, and claims priority from, U.S. Application No. 60/929,626, filed Jul. 5, 2007, both of which are incorporated herein by reference in their entireties.

TECHNICAL FIELD

The invention relates to radiation dosimeter and storage phosphor materials. More particularly, but not exclusively, it relates to fluoroperovskites doped with optically active ions for the detection of ionizing radiation by optically stimulated luminescence (OSL) and thermally stimulated luminescence (TSL).

BACKGROUND OF THE INVENTION

TSL dosimeters (for example, LiF) are widely used for accurate measurements of the radiation dose upon exposure to ionizing radiation—for example, X-rays, gamma rays, beta particles, alpha particles and neutrons. The ionizing radiation leads to trapped electrons and holes. The dose information is read by heating the dosimeter at a controlled rate to high temperatures. The integrated emitted luminescence intensity can be used to determine the radiation dose. This type of dosimeter typically requires an expensive reader and the dose information can only be read once.

OSL dosimeters (for example, $Al_2O_3$:C) have recently been developed. Exposure to ionizing radiation leads to trapped electrons and holes. The OSL read-out process is via exposure to light, and the emitted light intensity provides the dose information. This type of dosimeter has the advantage that dose information can be read by optical means, and no heating is required. For personal dosimeters, it is advantageous if the effective atomic number ($Z_{eff}$) is close to that of tissue, for which $Z_{eff}$=7.42.

X-ray storage phosphors, such as those disclosed in U.S. Pat. No. 3,859,527, are substitutes for X-ray film, which may be used in industrial and Medical imaging. They are formed as screens of powdered crystalline phosphor material—BaFBr doped with ~1000 ppm $Eu^{2+}$ is the most common material—with the crystal grains held in place by a transparent binder. Upon exposure to X-rays, electron-hole pairs are created in the crystalline material and the electrons and holes can be separately trapped at defect and impurity sites. The spatial distribution and concentration of trapped electrons and holes represents a two-dimensional stored image of the incident X-ray intensity and hence of any object that is placed in the X-ray beam.

Recombination of the electrons and the holes can be stimulated by illuminating the material with red light that promotes one or other carrier to the conduction or valence band, where it is free to move to recombine with the conjugate charge carrier. The recombination energy is emitted in the form of a visible photon, which may be detected with a photomultiplier. This stimulation process is called optically stimulated luminescence.

If the stimulation is provided by a raster-scanned red laser beam, then the photo-stimulated luminescence intensity follows that of the X-ray image. The read-out process is destructive in nature, but the imaging plate can then be re-used. The primary disadvantages are poorer resolution and greater initial cost as compared to X-ray film. The imaging plates also have a dark decay, which means that the image must be read-out within 24 hours.

The perovskites are a general group of compounds which have the same crystal structure. The basic chemical formula follows the pattern $ABO_3$, where A and B are cations of different sizes (for example, $CaTiO_3$). The general crystal structure is a primitive cube, with the A-cation in the middle of the cube, the B-cation in the corner and the anion, commonly oxygen, in the centre of the face edges.

The fluoroperovskites are analogous compounds of the composition $AMF_3$, wherein A is an alkali metal and M is an alkaline earth or transition metal.

Divalent and trivalent fluorides, such as those disclosed in U.S. Pat. No. 5,028,509, are known to display OSL. Such fluorides may be used in applications that include X-ray imaging plates (see, for example, U.S. Pat. No. 3,859,527) and thermal neutron imaging plates (see, for example, U.S. Pat. No. 5,635,727).

Some fluoroperovskites are also known to display OSL and TSL and hence they have potential applications in dosimetry and radiation imaging. U.S. Pat. No. 6,583,434 discloses that $RbCdF_3$:$Mn^{2+}$, $RbMgF_3$:$Mn^{2+}$, $CsCdF_3$:$Mn^{2+}$ and $CsMgF_3$:$Mn^{2+}$ display OSL after X-ray irradiation and stimulation with light at 266 nm. No OSL was observed from $NaMgF_3$:$Mn^{2+}$.

U.S. Pat. No. 7,141,794 discloses fast photo-luminescence from scintillator compositions comprising a halide perovskite activated with $Ce^{3+}$ or $Pr^{3+}$.

It is an object of the present invention to provide compounds for use as radiation dosimeters and/or storage phosphors; and/or to overcome one or more of the above-mentioned disadvantages; and/or to at least provide the public with a useful choice.

Other objects of the invention may become apparent from the following description, which is given by way of example only.

In this specification where reference has been made to patent specifications, other external documents, or other sources of information, this is generally for the purpose of providing a context for discussing the features of the invention. Unless specifically stated otherwise, such references are not to be construed as an admission that such external documents, or such sources of information, in any jurisdiction, are prior art, or form part of the common general knowledge in the art.

SUMMARY OF THE INVENTION

In a first aspect, the present invention provides a phosphor-doped fluoroperovskite compound, capable of storing at least part of the energy of incident ionizing radiation, and releasing at least part of the stored energy upon optical stimulation, wherein the phosphor-doped fluoroperoyskite compound is selected from the group consisting of:

$Na_{1-(x+x')}K_xRb_{x'}Mg_{1-y}Zn_yF_{3-z}Cl_z$:$Z^{d+}$ wherein $Z^{d+}$ is the dopant phosphor ion and is selected from the group consisting of: the transition metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and wherein (x+x')≤0.1, y≤0.1 and z≤0.3;

$K_{1-(x+x')}Na_xRb_{x'}Mg_{1-y}Zn_yF_{3-z}Cl_z$:$Z^{d+}$ wherein $Z^{d+}$ is the dopant phosphor ion and is selected from the group consisting of: the transition metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$;

Gd$^{3+}$; and Tb$^{3+}$; and Tl$^+$; In$^+$; Ga$^+$; and Pb$^{2+}$; and wherein (x+x')≤0.1, y≤0.1 and z≤0.3; and Rb$_{1-(x+x'\eta)}$Na$_x$K$_{x'}$Mg$_{1-y}$Zn$_y$F$_{3-z}$Cl$_z$:Z$^{d+}$ wherein Z$^{d+}$ is the dopant phosphor ion and is selected from the group consisting of: the transition metal ions: Cu$^+$; Ag$^+$; Mn$^{3+}$; Mn$^{4+}$; and Cr$^{3+}$; the rare earth metal ions: Eu$^{2+}$; Sm$^{2+}$; Sm$^{3+}$; Pr$^{3+}$; Ce$^{3+}$; Gd$^{3+}$; and Tb$^{3+}$; and Tl$^+$; In$^+$; Ga$^+$; and Pb$^{2+}$; and wherein (x+x')≤0.1, y≤0.1 and z≤0.3;

and mixtures of any two or more thereof.

In one embodiment, wherein the phosphor-doped fluoroperovskite compound is Na$_{1-(x+x'\eta)}$K$_x$Rb$_{x'}$Mg$_{1-y}$Zn$_y$F$_{3-z}$Cl$_z$:Z$^{d+}$, the dopant phosphor ion is selected from the group consisting of: the transition metal ions: Cu$^+$; Ag$^+$; Mn$^{2+}$; Mn$^{3+}$; Mn$^{4+}$; and Cr$^{3+}$; and the rare earth metal ions: Eu$^{2+}$; Sm$^{2+}$; Sm$^{3+}$; Pr$^{3+}$; Gd$^{3+}$; and Tb$^{3+}$.

In a preferred embodiment, wherein the phosphor-doped fluoroperovskite compound is Na$_{1-(x+x'\eta)}$K$_x$Rb$_x$Mg$_{1-y}$Zn$_y$F$_{3-z}$Cl$_z$:Z$^{d+}$, the dopant phosphor ion is selected from the group consisting of: Eu$^{2+}$; Pr$^{3+}$; Tb$^{3+}$; and Mn$^{2+}$.

In a preferred embodiment, wherein the phosphor-doped fluoroperovskite compound is Na$_{1-(x+x'\eta)}$K$_x$Rb$_x$Mg$_{1-y}$Zn$_y$F$_{3-z}$Cl$_z$:Z$^{d+}$, the dopant phosphor ion is Eu$^{2+}$ or Mn$^{2+}$.

In a preferred embodiment, wherein the phosphor-doped fluoroperovskite compound is Na$_{1-(x+x'\eta)}$K$_x$Rb$_x$Mg$_{1-y}$Zn$_y$F$_{3-z}$Cl$_z$:Z$^{d+}$, the dopant phosphor ion is Eu$^{2+}$.

In a preferred embodiment, wherein the phosphor-doped fluoroperovskite compound is Na$_{1-(x+x'\eta)}$K$_x$Rb$_x$Mg$_{1-y}$Zn$_y$F$_{3-z}$Cl$_z$:Z$^{d+}$, the dopant phosphor ion is Mn$^{2+}$.

In one embodiment, wherein the phosphor-doped fluoroperovskite compound is Rb$_{1-(x+x'\eta)}$Na$_x$K$_x$Mg$_{1-y}$Zn$_y$F$_{3-z}$Cl$_z$:Z$^{d+}$, the dopant phosphor ion is selected from the group consisting of: the transition metal ions: Cu$^+$; Ag$^+$; Mn$^{3+}$; Mn$^{4+}$; and Cr$^{3+}$; the rare earth metal ions: Sm$^{2+}$; Sm$^{3+}$; Pr$^{3+}$; Ce$^{3+}$; Gd$^{3+}$; and Tb$^{3+}$; and Tl$^+$; In$^+$; Ga$^+$; and Pb$^{2+}$.

In a second aspect, the present invention provides a phosphor-doped fluoroperovskite compound, capable of storing at least part of the energy of incident ionizing radiation, and releasing at least part of the stored energy upon optical stimulation, wherein the phosphor-doped fluoroperovskite compound is selected from the group defined above, with the proviso that the phosphor-doped fluoroperovskite compound is not NaMgF$_3$:Eu$^{2+}$ or NaMgF$_3$:Mn$^{2+}$.

In a third aspect, the present invention provides a phosphor-doped fluoroperovskite compound, capable of storing at least part of the energy of incident ionizing radiation, and releasing at least part of the stored energy upon optical stimulation, wherein the phosphor-doped fluoroperovskite compound is selected from the group consisting of:

Na$_{1-(x+x'\eta)}$K$_x$Rb$_x$Mg$_{1-y}$Zn$_y$F$_{3-z}$Cl$_z$:Z$^{d+}$ wherein Z$^{d+}$ is the dopant phosphor ion and is selected from the group consisting of: the transition metal ions: Cu$^+$; Ag$^+$; Mn$^{3+}$; Mn$^{4+}$; and Cr$^{3+}$; the rare earth metal ions: Sm$^{2+}$; Sm$^{3+}$; Pr$^{3+}$; Gd$^{3+}$; and Tb$^{3+}$; and Tl$^+$; In$^+$; Ga$^+$; and Pb$^{2+}$; and wherein (x+x')≤0.1, y≤0.1 and z≤0.3;

K$_{1-(x+x'\eta)}$Na$_x$Rb$_x$Mg$_{1-y}$Zn$_y$F$_{3-z}$Cl$_z$:Z$^{d+}$ wherein Z$^{d+}$ is the dopant phosphor ion and is selected from the group consisting of: the transition metal ions: Cu$^+$; Ag$^+$; Mn$^{2+}$; Mn$^{3+}$; Mn$^{4+}$; and Cr$^{3+}$; the rare earth metal ions: Eu$^{2+}$; Sm$^{2+}$; Sm$^{3+}$; Pr$^{3+}$; Gd$^{3+}$; and Tb$^{3+}$; and Tl$^+$; In$^+$; Ga$^+$; and Pb$^{2+}$; and wherein (x+x')≤0.1, y≤0.1 and z≤0.3; and Rb$_{1-(x+x'\eta)}$Na$_x$K$_x$Mg$_{1-y}$Zn$_y$F$_{3-z}$Cl:Z$^{d+}$ wherein Z$^{d+}$ is the dopant phosphor ion and is selected from the group corilsting of: the transition metal ions: Cu$^+$; Ag$^+$; Mn$^{3+}$; Mn$^{4+}$; and Cr$^{3+}$; the rare earth metal ions: Eu$^{2+}$; Sm$^{2+}$; Sm$^{3+}$; Pr$^{3+}$; Ce$^{3+}$; Gd$^{3+}$; and Tb$^{3+}$; and Tl$^+$; In$^+$; Ga$^+$; and Pb$^{2+}$; and wherein (x+x')≤0.1, y≤0.1 and z≤0.3;

and mixtures of any two or more thereof.

In one embodiment, wherein the phosphor-doped fluoroperovskite compound is Na$_{1-(x+x'\eta)}$K$_x$Rb$_x$Mg$_{1-y}$Zn$_y$F$_{3-z}$Cl$_z$:Z$^{d+}$, the dopant phosphor ion is selected from the group consisting of: the transition metal ions: Cu$^+$; Ag$^+$; Mn$^{3+}$; Mn$^{4+}$; and Cr$^{3+}$; and the rare earth metal ions: Sm$^{2+}$; Sm$^{3+}$; Pr$^{3+}$; Gd$^{3+}$; and Tb$^{3+}$.

In a preferred embodiment, wherein the phosphor-doped fluoroperovskite compound is Na$_{1-(x+x'\eta)}$K$_x$Rb$_x$Mg$_{1-y}$Zn$_y$F$_{3-z}$Cl$_z$:Z$^{d+}$, the dopant phosphor ion is Pr$^{3+}$ or Tb$^{3+}$.

In one embodiment, wherein the phosphor-doped fluoroperovskite compound is K$_{1-(x+x'\eta)}$Na$_x$Rb$_x$Mg$_{1-y}$Zn$_y$F$_{3-z}$Cl$_z$:Z$^{d+}$, the dopant phosphor ion is selected from the group consisting of: the transition metal ions: Cu$^+$; Ag$^+$; Mn$^{2+}$; Mn$^{3+}$; Mn$^{4+}$; and Cr$^{3+}$; and the rare earth metal ions: Eu$^{2+}$; Sm$^{2+}$; Sm$^{3+}$; Pr$^{3+}$; Gd$^{3+}$; and Tb$^{3+}$.

In one embodiment, wherein the phosphor-doped fluoroperovskite compound is Rb$_{1-(x+x'\eta)}$Na$_x$K$_x$Mg$_{1-y}$Zn$_y$F$_{3-z}$Cl$_z$:Z$^{d+}$, the dopant phosphor ion is selected from the group consisting of: the transition metal ions: Cu$^+$; Ag$^+$; Mn$^{3+}$; Mn$^{4+}$; and Cr$^{3+}$; the rare earth metal ions: Sm$^{2+}$; Sm$^{3+}$; Pr$^{3+}$; Ce$^{3+}$; Gd$^{3+}$, and Tb$^{3+}$; and Tl$^+$; In$^+$; Ga$^+$; and Pb$^{2+}$.

In one embodiment, wherein the phosphor-doped fluoroperovskite compound is Rb$_{1-(x+x'\eta)}$Na$_x$K$_x$Mg$_{1-y}$Zn$_y$F$_{3-z}$Cl$_z$:Z$^{d+}$, the dopant phosphor ion is selected from the group consisting of: the transition metal ions: Cu$^+$; Ag$^+$; Mn$^{3+}$; Mn$^{4+}$; and Cr$^{3+}$; and the rare earth metal ions: Eu$^{2+}$; Sm$^{2+}$; Sm$^{3+}$; Pr$^{3+}$; Ce$^{3+}$; Gd$^{3+}$; and Tb$^{3+}$.

In an alternative embodiment, wherein the phosphor-doped fluoroperovskite compound is Rb$_{1-(x+x'\eta)}$Na$_x$K$_x$Mg$_{1-y}$Zn$_y$F$_{3-z}$Cl$_z$:Z$^{d+}$, the dopant phosphor ion is selected from the group consisting of: the transition metal ions: Cu$^+$; Ag$^+$; Mn$^{3+}$; Mn$^{4+}$; and Cr$^{3+}$; and the rare earth metal ions: Sm$^{2+}$; Sm$^{3+}$; Pr$^{3+}$; Ce$^{3+}$; Gd$^{3+}$; and Tb$^{3+}$.

In a preferred embodiment, wherein the phosphor-doped fluoroperovskite compound is Rb$_{1-(x+x'\eta)}$Na$_x$K$_x$Mg$_{1-y}$Zn$_y$F$_{3-z}$Cl$_z$:Z$^{d+}$, the dopant phosphor ion is Eu$^{2+}$ or Ce$^{3+}$.

In a preferred embodiment, wherein the phosphor-doped fluoroperovskite compound is Na$_{1-(x+x'\eta)}$K$_x$Rb$_x$Mg$_{1-y}$Zn$_y$F$_{3-z}$Cl$_z$:Z$^{d+}$, the dopant phosphor ion is Pr$^{3+}$.

In a preferred embodiment, wherein the phosphor-doped fluoroperovskite compound is Na$_{1-(x+x'\eta)}$K$_x$Rb$_x$Mg$_{1-y}$Zn$_y$F$_{3-z}$Cl$_z$:Z$^{d+}$, the dopant phosphor ion is Tb$^{3+}$.

In a preferred embodiment, wherein the phosphor-doped fluoroperovskite compound is K$_{1-(x+x'\eta)}$Na$_x$Rb$_x$Mg$_{1-y}$Zn$_y$F$_{3-z}$Cl$_z$:Z$^{d+}$, the dopant phosphor ion is Eu$^{2+}$.

In a preferred embodiment, wherein the phosphor-doped fluoroperovskite compound is Rb$_{1-(x+x'\eta)}$Na$_x$K$_x$Mg$_{1-y}$Zn$_y$F$_{3-z}$Cl$_z$:Z$^{d+}$, the dopant phosphor ion is Eu$^{2+}$.

In a preferred embodiment, wherein the phosphor-doped fluoroperovskite compound is Rb$_{1-(x+x'\eta)}$Na$_x$K$_x$Mg$_{1-y}$Zn$_y$F$_{3-z}$Cl$_z$:Z$^{d+}$, the dopant phosphor ion is Ce$^{3+}$.

In one embodiment, x, x', y and z are all about 0.

In a fourth aspect, the present invention provides a phosphor-doped fluoroperovskite compound, capable of storing at least part of the energy of incident ionizing radiation, and releasing at least part of the stored energy upon optical stimulation, wherein the phosphor-doped fluoroperovskite compound is selected from the group consisting of:

NaMgF$_3$:Z$^{d+}$ wherein Z$^{d+}$ is the dopant phosphor ion and is selected from the group consisting of: the transition metal ions: Cu$^+$; Ag$^+$; Mn$^{2+}$; Mn$^{3+}$; Mn$^{4+}$; and Cr$^{3+}$; the rare earth metal ions: Eu$^{2+}$; Sm$^{2+}$; Sm$^{3+}$; Pr$^{3+}$; Gd$^{3+}$; and Tb$^{3+}$; and Tl$^+$; In$^+$; Ga$^+$; and Pb$^{2+}$;

KMgF$_3$:Z$^{d+}$ wherein Z$^{d+}$ is the dopant phosphor ion and is selected from the group consisting of: the transition metal ions: Cu$^+$; Ag$^+$; Mn$^{2+}$; Mn$^{3+}$; Mn$^{4+}$; and Cr$^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and $RbMgF_3:Z^{d+}$ wherein $Z^{d+}$ is the dopant phosphor ion and is selected from the group consisting of: the transition metal ions: $Cu^+$; $Ag^+$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Ce^{3+}$; $Gd^{3+}$; and $Tb^{3+}$; and $Tl^+$; $In^+$; $Ga^+$; and $Pb^{2+}$;

and mixtures of any two or more thereof.

In one embodiment, wherein the phosphor-doped fluoroperovskite compound is $NaMgF_3:Z^{d+}$, the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment, wherein the phosphor-doped fluoroperovskite compound is $NaMgF_3:Z^{d+}$, the dopant phosphor ion is selected from the group consisting of: $Eu^{2+}$; $Pr^{3+}$; $Tb^{3+}$; and $Mn^{2+}$.

In a preferred embodiment, wherein the phosphor-doped fluoroperovskite compound is $NaMgF_3:Z^{d+}$, the dopant phosphor ion is $Eu^{2+}$ or $Mn^{2+}$.

In a preferred embodiment, wherein the phosphor-doped fluoroperovskite compound is $NaMgF_3$:e, the dopant phosphor ion is $Eu^{2+}$.

In a preferred embodiment, wherein the phosphor-doped fluoroperovskite compound is $NaMgF_3:Z^{d+}$, the dopant phosphor ion is $Mn^{2+}$.

In a preferred embodiment, the phosphor-doped fluoroperovskite compound is selected from the group consisting of: $NaMgF_3:Eu^{2+}$; $NaMgF_3:Pr^{3+}$; $NaMgF_3:Tb^{3+}$; $NaMgF_3:Mn^{2+}$; $KMgF_3:Eu^{2+}$; $RbMgF_3:Eu^{2+}$; and $RbMgF_3:Ce^{3+}$.

In a further preferred embodiment, the phosphor-doped fluoroperovskite compound is selected from the group consisting of: $NaMgF_3:0.2\%$ $Eu^{2+}$; $NaMgF_3:0.1\%$ $Pr^{3+}$; $NaMgF_3:0.2\%$ $Tb^{3+}$; $NaMgF_3:0.2\%$ $Mn^{2+}$; $KMgF_3:0.2\%$ $Eu^{2+}$; $RbMgF_3:0.2\%$ $Eu^{2+}$; and $RbMgF_3:0.2\%$ $Ce^{3+}$.

In a preferred embodiment, the phosphor-doped fluoroperovskite compound is selected from the group consisting of: $NaMgF_3:Eu^{2+}$; $NaMgF_3:Pr^{3+}$; $NaMgF_3:Tb^{3+}$; $NaMgF_3:Mn^{2+}$; $KMgF_3:Eu^{2+}$; and $RbMgF_3:Ce^{3+}$.

In a further preferred embodiment, the phosphor-doped fluoroperovskite compound is selected from the group consisting of: $NaMgF_3:0.2\%$ $Eu^{2+}$; $NaMgF_3:0.1\%$ $Pr^{3+}$; $NaMgF_3:0.2\%$ $Tb^{3+}$; $NaMgF_3:0.2\%$ $Mn^{2+}$; $KMgF_3:0.2\%$ $Eu^{2+}$; and $RbMgF_3:0.2\%$ $Ce^{3+}$.

In a further preferred embodiment, the phosphor-doped fluoroperovskite compound is $NaMgF_3:0.2\%$ $Eu^{2+}$.

In a further preferred embodiment, the phosphor-doped fluoroperovskite compound is $RbMgF_3:0.2\%$ $Eu^{2+}$.

In a fifth aspect, the present invention provides a phosphor-doped fluoroperovskite compound, capable of storing at least part of the energy of incident ionizing radiation, and releasing at least part of the stored energy upon optical stimulation, wherein the phosphor-doped fluoroperovskite compound is selected from the group consisting of:

$NaMgF_3:Z^{d+}$ wherein $Z^{d+}$ is the dopant phosphor ion and is selected from the group consisting of: the transition metal ions: $Cu^+$; $Ag^+$; $Mn^{3+}$; $Mn^{4+}$; and $Cr^{3+}$; the rare earth metal ions: $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$;

$KMgF_3:Z^{d+}$ wherein $Z^{d+}$ is the dopant phosphor ion and is selected from the group consisting of: the transition metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and $RbMgF_3:Z^{d+}$ wherein $Zd^{d+}$ is the dopant phosphor ion and is selected from the group consisting of: the transition metal ions: $Cu^+$; $Ag^+$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Ce^{3+}$; $Gd^{3+}$; and $Tb^{3+}$; and $Tl^+$; $In^+$; $Ga^+$; and $Pb^{2+}$;

and mixtures of any two or more thereof.

In one embodiment, wherein the phosphor-doped fluoroperovskite compound is $NaMgF_3:Z^{d+}$, the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Sm^{2+}$; $Sm^{3+}$; $Pr^{3+}$; $Gd^{3+}$; and $Tb^{3+}$.

In a preferred embodiment, wherein the phosphor-doped fluoroperovskite compound is $NaMgF_3:Z^{d+}$, the dopant phosphor ion is $Pr^{3+}$ or $Tb^{3+}$.

In one embodiment, wherein the phosphor-doped fluoroperovskite compound is $KMgF_3:Z^{d+}$, the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In one embodiment, wherein the phosphor-doped fluoroperovskite compound is $RbMgF_3:Z^{d+}$, the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Ce^{3+}$; $Gd^{3+}$; and $Tb^{3+}$.

In an alternative embodiment, wherein the phosphor-doped fluoroperovskite compound is $RbMgF_3:Z^{d+}$, the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Sm^{2+}$; $Sm^{3+}$; $Pr^{3+}$; $Ce^{3+}$; $Gd^{3+}$; and $Tb^{3+}$.

In a preferred embodiment, wherein the phosphor-doped fluoroperovskite compound is $RbMgF_3:Z^{d+}$, the dopant phosphor ion is $Eu^{2+}$ or $Ce^{3+}$.

In a preferred embodiment, wherein the phosphor-doped fluoroperovskite compound is $NaMgF_3:Z^{d+}$, the dopant phosphor ion is $Pr^{3+}$.

In a preferred embodiment, wherein the phosphor-doped fluoroperovskite compound is $NaMgF_3:Z^{d+}$, the dopant phosphor ion is $Tb^{3+}$.

In a preferred embodiment, wherein the phosphor-doped fluoroperovskite compound is $KMgF_3:Z^{d+}$, the dopant phosphor ion is $Eu^{2+}$.

In a preferred embodiment, wherein the phosphor-doped fluoroperovskite compound is $RbMgF_3:Z^{d+}$, the dopant phosphor ion is $Eu^{2+}$.

In a preferred embodiment, wherein the phosphor-doped fluoroperovskite compound is $RbMgF_3:Z^{d+}$, the dopant phosphor ion is $Ce^{3+}$.

In a preferred embodiment, the phosphor-doped fluoroperovskite compound is selected from the group consisting of: $NaMgF_3:Pr^{3+}$; $NaMgF_3:Tb^{3+}$; $KMgF_3:Eu^{2+}$; $RbMgF_3:Eu^{2+}$; and $RbMgF_3:Ce^{3+}$.

In a further preferred embodiment, the phosphor-doped fluoroperovskite compound is selected from the group consisting of: $NaMgF_3:0.1\%\,Pr^{3+}$; $NaMgF_3:0.2\%\,Tb^{3+}$; $KMgF_3:0.2\%\,Eu^{2+}$; $RbMgF_3:0.2\%\,Eu^{2+}$; and $RbMgF_3:0.2\%\,Ce^{3+}$.

In a preferred embodiment, the phosphor-doped fluoroperovskite compound is selected from the group consisting of: $NaMgF_3:Pr^{3+}$; $NaMgF_3:Tb^{3+}$; $KMgF_3:Eu^{2+}$; and $RbMgF_3:Ce^{3+}$.

In a further preferred embodiment, the phosphor-doped fluoroperovskite compound is selected from the group consisting of: $NaMgF_3:0.1\%\,Pr^{3+}$; $NaMgF_3:0.2\%\,Tb^{3+}$; $KMgF_3:0.2\%\,Eu^{2+}$; and $RbMgF_3:0.2\%\,Ce^{3+}$ In one embodiment of any of the first to the fifth aspects of the invention, at least part of the stored energy is released from the phosphor-doped fluoroperovskite compound upon optical stimulation in a wavelength range from about 200 nm to about 1000 nm. In one embodiment, the optical stimulation wavelength is from about 290 nm to about 350 nm. In a preferred embodiment, the optical stimulation wavelength is from about 300 nm to about 1000 nm. In one embodiment, the optical stimulation wavelength is about 470 nm. In a further preferred embodiment, the optical stimulation wavelength is in the near infrared (>700 nm). In a further preferred embodiment, the optical stimulation wavelength is about 875 nm.

In a preferred embodiment of any of the first to the fifth aspects of the invention, the stored energy is released from the phosphor-doped fluoroperovskite compound at a wavelength that is shorter than the optical stimulation wavelength.

In a sixth aspect, the present invention provides a phosphor-doped fluoroperovskite compound, capable of storing at least part of the energy of incident ionizing radiation, and releasing at least part of the stored energy upon heating, wherein the phosphor-doped fluoroperovskite compound is selected from the group consisting of:

$Na_{1-(x+x')}K_xRb_xMg_{1-y}Zn_yF_{3-z}Cl_z:Z^{d+}$ wherein $Z^{d+}$ is the dopant phosphor ion and is selected from the group consisting of: the transition metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and wherein $(x+x') \leq 0.1$, $y \leq 0.1$ and $z \leq 0.3$; and $Rb_{1-(x+x')}Na_xK_xMg_{1-y}Zn_yF_{3-z}Cl_z:Z^{d+}$ wherein $Z^{d+}$ is the dopant phosphor ion and is selected from the group consisting of: the transition metal ions: $Cu^+$; $Ag^+$; $Mn^{2+}$; $Mn^{3+}$; $Mn^{4+}$; and $Cr^{3+}$; the rare earth,metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and wherein $(x+x') \leq 0.1$, $y \leq 0.1$ and $z \leq 0.3$;

and mixtures of any two or more thereof.

In one embodiment, wherein the phosphor-doped fluoroperovskite compound is $Na_{1-(x+x')}K_xRb_xMg_{1-y}Zn_yF_{3-z}Cl_z:Z^{d+}$, the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment, wherein the phosphor-doped fluoroperovskite compound is $Na_{1-(x+x')}K_xRb_xMg_{1-y}Zn_yF_{3-z}Cl_z:Z^{d+}$; the dopant phosphor ion is selected from the group consisting of: $Eu^{2+}$; $Pr^{3+}$; $Tb^{3+}$; and $Mn^{2+}$.

In a preferred embodiment, wherein the phosphor-doped fluoroperovskite compound is $Na_{1-(x+x')}K_xRb_xMg_{1-y}Zn_yF_{3-z}Cl_z:Z^{d+}$, the dopant phosphor ion is $Eu^{2+}$ or $Mn^{2+}$.

In a preferred embodiment, wherein the phosphor-doped fluoroperovskite compound is $Na_{1-(x+x')}K_xRb_xMg_{1-y}Zn_yF_{3-z}Cl_z:Z^{d+}$, the dopant phosphor ion is $Eu^{2+}$.

In a preferred embodiment, wherein the phosphor-doped fluoroperovskite compound is $Na_{1-(x+x')}K_xRb_xMg_{1-y}Zn_yF_{3-z}Cl_z:Z^{d+}$, the dopant phosphor ion is $Mn^{2+}$.

In one embodiment, wherein the phosphor-doped fluoroperovskite compound is $Rb_{1-(x+x')}Na_xK_xMg_{1-y}Zn_yF_{3-z}Cl_z:Z^{d+}$, the dopant phosphor ion is selected from the group consisting of the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment, wherein the phosphor-doped fluoroperovskite compound is $Rb_{1-(x+x')}Na_xK_xMg_{1-y}Zn_yF_{3-z}Cl_z:Z^{d+}$, the dopant phosphor ion is $Eu^{2+}$ or $Mn^{2+}$.

In a preferred embodiment, wherein the phosphor-doped fluoroperovskite compound is $Rb_{1-(x+x')}Na_xK_xMg_{1-y}Zn_yF_{3-z}Cl_z:Z^{d+}$, the dopant phosphor ion is $Mn^{2+}$.

In a seventh aspect, the present invention provides a phosphor-doped fluoroperovskite compound, capable of storing at least part of the energy of incident ionizing radiation, and releasing at least part of the stored energy upon heating, wherein the phosphor-doped fluoroperovskite compound is selected from the group defined above, with the proviso that the phosphor-doped fluoroperovskite compound is not $NaMgF_3:Eu^{2+}$, $NaMgF_3:Mn^{2+}$, or $RbMgF_3:Mn^{2+}$.

In an eighth aspect, the present invention provides a phosphor-doped fluoroperovskite compound, capable of storing at least part of the energy of incident ionizing radiation, and releasing at least part of the stored energy upon heating, wherein the phosphor-doped fluoroperovskite compound is selected from the group consisting of:

$Na_{1-(x+x')}K_xRb_xMg_{1-y}Zn_yF_{3-z}Cl_z:Z^{d+}$ wherein $Z^{d+}$ is the dopant phosphor ion and is selected from the group consisting of: the transition metal ions: $Cu^+$; $Ag^+$; $Mn^{3+}$; $Mn^{4+}$; and $Cr^{3+}$; the rare earth metal ions: $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and wherein $(x+x') \leq 0.1$, $y \leq 0.1$ and $z \leq 0.3$; and $Rb_{1-(x+x')}Na_xK_xMg_{1-y}Zn_yF_{3-z}Cl_z:Z^{d+}$ wherein $Z^{d+}$ is the dopant phosphor ion and is selected from the group consisting of: the transition metal ions: $Cu^+$; $Ag^+$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and wherein $(x+x') \leq 0.1$, $y \leq 0.1$ and $z \leq 0.3$;

and mixtures of any two or more thereof.

In one embodiment, wherein the phosphor-doped fluoroperovskite compound is $Na_{1-(x+x')}K_xRb_xMg_{1-y}Zn_yF_{3-z}Cl_z:Z^{d+}$, the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Sm^{2+}$; $Sm^{3+}$; $Pr^{3+}$; $Gd^{3+}$; and $Tb^{3+}$.

In a preferred embodiment, wherein the phosphor-doped fluoroperovskite compound is $Na_{1-(x+x')}K_xRb_xMg_{1-y}Zn_yCl_z:Z^{d+}$, the dopant phosphor ion is $Pr^{3+}$ or $Tb^{3+}$.

In one embodiment, wherein the phosphor-doped fluoroperovskite compound is $Rb_{1-(x+x')}Na_xK_xMg_{1-y}Zn_yF_{3-z}Cl_z:Z^{d+}$, the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment, wherein the phosphor-doped fluoroperovskite compound is $Na_{1-(x+x')}K_xRb_xMg_{1-y}Zn_yF_{3-z}Cl_z:Z^{d+}$, the dopant phosphor ion is $Pr^{3+}$.

In a preferred embodiment, wherein the phosphor-doped fluoroperovskite compound is $Na_{1-(x+x')}K_xRb_xMg_{1-y}Zn_yF_{3-z}Cl_z:Z^{d+}$, the dopant phosphor ion is $Tb^{3+}$.

In a preferred embodiment, wherein the phosphor-doped fluoroperovskite compound is $Rb_{1-(x+x')}Na_xK_xMg_{1-y}Zn_yF_{3-z}Cl_z:Z^{d+}$, the dopant phosphor ion is $Eu^{2+}$.

In one embodiment, x, x', y and z are all about 0.

In a ninth aspect, the present invention provides a phosphor-doped fluoroperovskite compound, capable of storing at least part of the energy of incident ionizing radiation, and releasing at least part of the stored energy upon heating, wherein the phosphor-doped fluoroperovskite compound is selected from, the group consisting of:

$NaMgF_3: Z^{d+}$ wherein $Z^{d+}$ is the dopant phosphor ion and is selected from the group consisting of: the transition, metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and $RbMgF_3:Z^{d+}$ wherein $Z^{d+}$ is the dopant phosphor ion and is selected from the group consisting of: the transition metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$;

and mixtures of any two or more thereof.

In one embodiment, wherein the phosphor-doped fluoroperovskite compound is $NaMgF_3: Zd^+$, the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment, wherein the phosphor-doped fluoroperovskite compound is $NaMgF_3:Z^{d+}$, the dopant phosphor ion is selected from the group consisting of: $Eu^{2+}$; $Pr^{3+}$; $Tb^{3+}$; and $Mn^{2+}$.

In a preferred embodiment, wherein the phosphor-doped fluoroperovskite compound is $NaMgF_3:Z^{d+}$, the dopant phosphor ion is $Eu^{2+}$ or $Mn^{2+}$.

In a preferred embodiment, wherein the phosphor-doped fluoroperovskite compound is $NaMgF_3: Z^{d+}$, the dopant phosphor ion is $Eu^{2+}$.

In a preferred embodiment, wherein the phosphor-doped fluoroperovskite compound is $NaMgF_3: Z^{d+}$, the dopant phosphor ion is $Mn^{2+}$.

In one embodiment, wherein the phosphor-doped fluoroperovskite compound is $RbMgF_3:Z^{d+}$, the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment, wherein the phosphor-doped fluoroperovskite compound is $RbMgF_3:Z^{d+}$, the dopant phosphor ion is $Eu^{2+}$ or $Mn^{2+}$.

In a preferred embodiment, wherein the phosphor-doped fluoroperovskite compound is $RbMgF_3:Z^{d+}$, the dopant phosphor ion is $Mn^{2+}$.

In a preferred embodiment, the phosphor-doped fluoroperovskite compound is selected from the group consisting of: $NaMgF_3:Eu^{2+}$; $NaMgF_3:Pr^{3+}$; $NaMgF_3:Tb^{3+}$; $NaMgF_3:Mn^{2+}$; $RbMgF_3:Eu^{2+}$; and $RbMgF_3:Mn^{2+}$.

In a further preferred embodiment; the phosphor-doped fluoroperovskite compound is selected from the group consisting of: $NaMgF_3:0.2\%$ $Eu^{2+}$; $NaMgF_3:0.1\%$ $Pr^{3+}$; $NaMgF_3:0.2\%$ $Tb^{3+}$; $NaMgF_3:0.2\%$ $Mn^{2+}$; $RbMgF_3:0.2\%$ $Eu^{2+}$; and $RbMgF_3:0.2\%$ $Mn^{2+}$.

In a further preferred embodiment, the phosphor-doped fluoroperovskite compound is $NaMgF_3:0.2\%$ $Eu^{2+}$.

In a tenth aspect, the present invention provides a phosphor-doped fluoroperovskite compound, capable of storing at least part of the energy of incident ionizing radiation, and releasing at least part of the stored energy upon heating, wherein the phosphor-doped fluoroperovskite compound is selected from the group consisting of:

$NaMgF_3:Z^{d+}$ wherein $Z^{d+}$ is the dopant phosphor ion and is selected from the group consisting of: the transition metal ions: $Cu^+$; $Ag^+$; $Mn^{3+}$; $Mn^{4+}$; and $Cr^{3+}$; the rare earth metal ions: $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and $RbMgF_3:Z^{d+}$ wherein $Z^{d+}$ is the dopant phosphor ion and is selected from the group consisting of: the transition metal ions: $Cu^+$; $Ag^+$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$;

and mixtures of any two or more thereof.

In one embodiment, wherein the phosphor-doped fluoroperovskite compound is $NaMgF_3: Z^{d+}$, the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Sm^{2+}$; $Sm^{3+}$; $Pr^{3+}$; $Gd^{3+}$; and $Tb^{3+}$.

In one embodiment, wherein the phosphor-doped fluoroperovskite compound is $RbMgF_3:Z^{d+}$, the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment, wherein the phosphor-doped fluoroperovskite compound is $NaMgF_3:Z^{d+}$, the dopant phosphor ion is $Pr^{3+}$ or $Tb^{3+}$.

In a preferred embodiment, wherein the phosphor-doped fluoroperovskite compound is $NaMgF_3:Z^{d+}$, the dopant phosphor ion is $Pr^{3+}$.

In a preferred embodiment, wherein the phosphor-doped fluoroperovskite compound is $NaMgF_3:Z^{d+}$, the dopant phosphor ion is $Tb^{3+}$.

In a preferred embodiment, wherein the phosphor-doped fluoroperovskite compound is $RbMgF_3:Z^{d+}$, the dopant phosphor ion is $Eu^{2+}$.

In a preferred embodiment, the phosphor-doped fluoroperovskite compound is selected from the group consisting of: $NaMgF_3:Pr^{3+}$; $NaMgF_3:Tb^{3+}$; and $RbMgF_3:Eu^{2+}$.

In a further preferred embodiment, the phosphor-doped fluoroperovskite compound is selected from the group consisting of: $NaMgF_3:0.1\%$ $Pr^{3+}$; $NaMgF_3:0.2\%$ $Tb^{3+}$; and $RbMgF_3:0.2\%$ $Eu^{2+}$.

In a further preferred embodiment, the phosphor-doped fluoroperovskite compound is $RbMgF_3:0.2\%$ $Eu^{2+}$.

In an eleventh aspect, the present invention provides a dosimeter for detecting ionizing radiation by OSL, comprising a phosphor-doped fluoroperovskite compound, capable of storing at least part of the energy of incident ionizing radiation, and releasing at least part of the stored energy upon optical stimulation, wherein the phosphor-doped fluoroperovskite compound is as defined for any of the first to the fifth aspects of the invention.

In a twelfth aspect, the present invention provides a radiation storage device comprising a phosphor-doped fluoroperovskite compound, capable of storing at least part of the energy of incident ionizing radiation, and releasing at least part of the stored energy upon optical stimulation, wherein the phosphor-doped fluoroperovskite compound is as defined for any of the first to the fifth aspects of the invention.

In a thirteenth aspect, the present invention provides a method of determining a dose of ionizing radiation comprising:

(a) providing a phosphor-doped fluoroperovskite compound, capable of storing at least part of the energy of incident ionizing radiation, and releasing at least part of the stored energy upon optical stimulation, wherein the phosphor-doped fluoroperovskite compound is as defined for any of the first to the fifth aspects of the invention;

(b) irradiating the phosphor-doped fluoroperovskite compound with ionizing radiation;

(c) optically stimulating the irradiated phosphor-doped fluoroperovskite compound with a predetermined intensity of light comprising at least one predetermined wavelength;

(d) measuring the intensity and duration of the optically stimulated luminescence from the irradiated phosphor-doped fluoroperovskite compound; and (e) relating, by calibration procedures, the intensity and duration of the optically stimulated luminescence to the dose of ionizing radiation absorbed by the phosphor-doped fluoroperovskite compound.

In a fourteenth aspect, the present invention provides a method for recording and reproducing an ionizing radiation image comprising the steps of:

(a) providing a phosphor-doped fluoroperovskite compound, capable of storing at least part of the energy of incident ionizing radiation, and releasing at least part of the stored energy upon optical stimulation, wherein the phosphor-doped fluoroperovskite compound is as defined for any of the first to the fifth aspects of the invention;

(b) causing ionizing radiation to be incident upon the compound through an object to be imaged, so that the compound stores energy from the radiation;
(c) exposing the compound to stimulating light to release the stored energy as emitted light;
(d) detecting the emitted light for imaging.

In one embodiment of any of the eleventh to the fourteenth aspects of the invention, the phosphor-doped fluoroperovskite compound is $Na_{1-(x+x'\eta)}K_xRb_xMg_{1-y}Zn_yF_{3-z}Cl_z:Z^{d+}$, and the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment of any of the eleventh to fourteenth aspects of the invention, the phosphor-doped fluoroperovskite compound is $Na_{1-(x+x'\eta)}K_xRb_xMg_{1-y}Zn_yF_{3-z}Cl_z:Z^{d+}$, and the dopant phosphor ion is selected from the group consisting of: $Eu^{2+}$; $Pr^{3+}$; $Tb^{3+}$; and $Mn^{2+}$.

In a preferred embodiment of any of the eleventh to fourteenth aspects of the invention, the phosphor-doped fluoroperovskite compound is $Na_{1-(x+x'\eta)}K_xRb_xMg_{1-y}Zn_yF_{3-z}Cl_z:Z^{d+}$, and the dopant phosphor ion is $Eu^{2+}$ or $Mn^{2+}$.

In a preferred embodiment of any of the eleventh to fourteenth aspects of the invention, the phosphor-doped fluoroperovskite compound is $Na_{1-(x+x'\eta)}K_xRb_xMg_{1-y}Zn_yF_{3-z}Cl_z:Z^{d+}$, and the dopant phosphor ion is $Eu^{2+}$.

In a preferred embodiment of any of the eleventh to fourteenth aspects of the invention, the phosphor-doped fluoroperovskite compound is $Na_{1-(x+x'\eta)}K_xRb_xMg_{1-y}Zn_yF_{3-z}Cl_z:Z^{d+}$, and the dopant phosphor ion is $Mn^{2+}$.

In one embodiment of any of the eleventh to the fourteenth aspects of the invention, the phosphor-doped fluoroperovskite compound is $Rb_{1-(x+x'\eta)}Na_xK_xMg_{1-y}Zn_yF_{3-z}Cl_z:Z^{d+}$, and the dopant phosphor ion is selected froth the group consisting of: the transition metal ions: $Cu^+$; $Ag^+$; $Mn^{3+}$; $Mn^{4+}$; and $Cr^{3+}$; the rare earth metal ions: $Sm^{2+}$; $Sm^{3+}$; $Pr^{3+}$; $Ce^{3+}$; $Gd^{3+}$; and $Tb^{3+}$; and $Tl^+$; $In^+$; $Ga^+$; and $Pb^{2+}$.

In one embodiment of any of the eleventh to the fourteenth aspects of the invention, the phosphor-doped fluoroperovskite compound is $Na_{1-(x+x'\eta)}K_xRb_xMg_{1-y}Zn_yF_{3-z}Cl_z:Z^{d+}$, and the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Sm^{2+}$; $Sm^{3+}$; $Pr^{3+}$; $Gd^{3+}$; and $Tb^{3+}$.

In a preferred embodiment of any of the eleventh to the fourteenth aspects of the invention, the phosphor-doped fluoroperovskite compound is $Na_{1-(x+x'\eta)}K_xRb_xMg_{1-y}Zn_yF_{3-z}Cl_z:Z^{d+}$, and the dopant phosphor ion is $Pr^{3+}$ or $Tb^{3+}$.

In one embodiment of any of the eleventh to the fourteenth aspects of the invention, the phosphor-doped fluoroperovskite compound is $K_{1-(x+x'\eta)}Na_xRb_xMg_{1-y}Zn_yF_{3-z}Cl_z:Z^{d+}$, and the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In one embodiment of any of the eleventh to the fourteenth aspects of the invention, wherein the phosphor-doped fluoroperovskite compound is $Rb_{1-(x+x'\eta)}Na_xK_xMg_{1-y}Zn_yF_{3-z}Cl_z:Z^{d+}$ and the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Ce^{3+}$; $Gd^{3+}$; and $Tb^{3+}$.

In an alternative embodiment of any of the eleventh to fourteenth aspects of the invention, the phosphor-doped fluoroperovskite compound is $Rb_{1-(x+x'\eta)}Na_xK_xMg_{1-y}Zn_yF_{3-z}Cl_z:Z^{d+}$, and the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Sm^{2+}$; $Sm^{3+}$; $Pr^{3+}$; $Ce^{3+}$; $Gd^{3+}$; and $Tb^{3+}$.

In a preferred embodiment of any of the eleventh to the fourteenth aspects of the invention, the phosphor-doped fluoroperovskite compound is $Rb_{1-(x+x'\eta)}Na_xK_xMg_{1-y}Zn_yF_{3-z}Cl_z:Z^{d+}$, and the dopant phosphor ion is $Eu^{2+}$ or $Ce^{3+}$.

In a preferred embodiment of any of the eleventh to the fourteenth aspects of the invention, the phosphor-doped fluoroperovskite compound is $Na_{1-(x+x'\eta)}K_xRb_xMg_{1-y}Zn_yF_{3-z}Cl_z:Z^{d+}$, and the dopant phosphor ion is $Pr^{3+}$.

In a preferred embodiment of any of the eleventh to the fourteenth aspects of the invention, the phosphor-doped fluoroperovskite compound is $Na_{1-(x+x'\eta)}K_xRb_xMg_{1-y}Zn_yF_{3-z}Cl_z:Z^{d+}$, and the dopant phosphor ion is $Tb^{3+}$.

In a preferred embodiment of any of the eleventh to the fourteenth aspects of the invention, the phosphor-doped fluoroperovskite compound is $K_{1-(x+x'\eta)}Na_xRb_xMg_{1-y}Zn_yF_{3-z}Cl_z:Z^{d+}$, and the dopant phosphor ion is $Eu^{2+}$.

In a preferred embodiment of any of the eleventh to the fourteenth aspects of the invention, the phosphor-doped fluoroperovskite compound is $Rb_{1-(x+x'\eta)}Na_xK_xMg_{1-y}Zn_yF_{3-z}Cl_z:Z^{d+}$, and the dopant phosphor ion is $Eu^{2+}$.

In a preferred embodiment of any of the eleventh to the fourteenth aspects of the invention, the phosphor-doped fluoroperovskite compound is $Rb_{1-(x+x'\eta)}Na_xK_xMg_{1-y}Zn_yF_{3-z}Cl_z:Z^{d+}$, and the dopant phosphor ion is $Ce^{3+}$.

In one embodiment of any of the eleventh to the fourteenth aspects of the invention, x, x', y and z are all about 0.

In one embodiment of any of the eleventh to the fourteenth aspects of the invention, the phosphor-doped fluoroperovskite compound is $NaMgF_3:Z^{d+}$, and the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment of any of the eleventh to the fourteenth aspects of the invention, the phosphor-doped fluoroperovskite compound is $NaMgF_3:Z^{d+}$, and the dopant phosphor ion is selected from the group consisting of: $Eu^{2+}$; $Pr^{3+}$; $Tb^{3+}$; and $Mn^{2+}$.

In a preferred embodiment of any of the eleventh to the fourteenth aspects of the invention, the phosphor-doped fluoroperovskite compound is $NaMgF_3:Z^{d+}$, and the dopant phosphor ion is $Eu^{2+}$ or $Mn^{2+}$.

In a preferred embodiment of any of the eleventh to the fourteenth aspects of the invention, the phosphor-doped fluoroperovskite compound is $NaMgF_3:Z^{d+}$, and the dopant phosphor ion is $Eu^{2+}$.

In a preferred embodiment of any of the eleventh to the fourteenth aspects of the invention, the phosphor-doped fluoroperovskite compound is $NaMgF_3:Z^{d+}$, and the dopant phosphor ion is $Mn^{2+}$.

In a preferred embodiment of any of the eleventh to the fourteenth aspects of the invention, the phosphor-doped fluoroperovskite compound is selected from the group consisting of: $NaMgF_3:Eu^{2+}$; $NaMgF_3:Pr^{3+}$; $NaMgF_3:Tb^{3+}$; $NaMgF_3:Mn^{2+}$; $KMgF_3:Eu^{2+}$; $RbMgF_3:Eu^{2+}$; and $RbMgF_3:Ce^{3+}$.

In a further preferred embodiment of any of the eleventh to the fourteenth aspects of the invention, the phosphor-doped fluoroperovskite compound is selected from the group consisting of: $NaMgF_3:0.2\%\ Eu^{2+}$; $NaMgF_3:0.1\%\ Pr^{3+}$; $NaMgF_3:0.2\%\ Tb^{3+}$; $NaMgF_3:0.2\%\ Mn^{2+}$; $KMgF_3:0.2\%\ Eu^{2+}$; $RbMgF_3:0.2\%\ Eu^{2+}$; and $RbMgF_3:0.2\%\ Ce^{3+}$.

In a preferred embodiment of any of the eleventh to the fourteenth aspects of the invention, the phosphor-doped fluoroperovskite compound is selected from the group consisting of: $NaMgF_3:Eu^{2+}$; $NaMgF_3:Pr^{3+}$; $NaMgF_3:Tb^{3+}$; $NaMgF_3:Mn^{2+}$; $KMgF_3:Eu^{2+}$; and $RbMgF_3:Ce^{3+}$.

In a further preferred embodiment of any of the eleventh to the fourteenth aspects of the invention, the phosphor-doped fluoroperovskite compound is selected from the group consisting of: $NaMgF_3$:0.2% $Eu^{2+}$; $NaMgF_3$:0.1% $Pr^{3+}$; $NaMgF_3$:0.2% $Tb^{3+}$; $NaMgF_3$:0.2% $Mn^{2+}$; $KMgF_3$:0.2% $Eu^{2+}$; and $RbMgF_3$:0.2% $Ce^{3+}$.

In a further preferred embodiment of any of the eleventh to the fourteenth aspects of the invention, the phosphor-doped fluoroperovskite compound is $NaMgF_3$:0.2% $Eu^{2+}$.

In a further preferred embodiment of any of the eleventh to the fourteenth aspects of the invention, the phosphor-doped fluoroperovskite compound is $RbMgF_3$:0.2% $Eu^{2+}$.

In one embodiment of any of the eleventh to the fourteenth aspects of the invention, the phosphor-doped fluoroperovskite compound is $NaMgF_3$:$Z^{d+}$, and the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Sm^{2+}$; $Sm^{3+}$; $Pr^{3+}$; $Gd^{3+}$; and $Tb^{3+}$.

In a preferred embodiment of any of the eleventh to the fourteenth aspects of the invention, the phosphor-doped fluoroperovskite compound is $NaMgF_3$:$Z^{d+}$, and the dopant phosphor ion is $Pr^{3+}$ or $Tb^{3+}$.

In one embodiment of any of the eleventh to the fourteenth aspects of the invention, the phosphor-doped fluoroperovskite compound is $KMgF_3$:$Z^{d+}$, and the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In one embodiment of any of the eleventh to the fourteenth aspects of the invention, the phosphor-doped fluoroperovskite compound is $RbMgF_3$:$Z^{d+}$, and the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Ce^{3+}$; $Gd^{3+}$; and $Tb^{3+}$.

In an alternative embodiment of any of the eleventh to the fourteenth aspects of the invention, the phosphor-doped fluoroperovskite compound is $RbMgF_3$:$Z^{d+}$, and the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Sm^{2+}$; $Sm^{3+}$; $Pr^{3+}$; $Ce^{3+}$; $Gd^{3+}$; and $Tb^{3+}$.

In a preferred embodiment of any of the eleventh to the fourteenth aspects of the invention, the phosphor-doped fluoroperovskite compound is $RbMgF_3$:$Z^{d+}$, and the dopant phosphor ion is $Eu^{2+}$ or $Ce^{3+}$.

In a preferred embodiment of any, of the eleventh to the fourteenth aspects of the invention, the phosphor-doped fluoroperovskite compound is $NaMgF_3$:$Z^{d+}$, and the dopant phosphor ion is $Pr^{3+}$.

In a preferred embodiment of any of the eleventh to the fourteenth aspects of the invention, the phosphor-doped fluoroperovskite compound is $NaMgF_3$:$Z^{d+}$, and the dopant phosphor ion is $Tb^{3+}$.

In a preferred embodiment of any of the eleventh to the fourteenth aspects of the invention, the phosphor-doped fluoroperovskite compound is $KMgF_3$:$Z^{d+}$, and the dopant phosphor ion is $Eu^{2+}$.

In a preferred embodiment of any of the eleventh to the fourteenth aspects of the invention, the phosphor-doped fluoroperovskite compound is $RbMgF_3$:$Z^{d+}$, and the dopant phosphor ion is $Eu^{2+}$.

In a preferred embodiment of any of the eleventh to the fourteenth aspects of the invention, the phosphor-doped fluoroperovskite compound is $RbMgF_3$:$Z^{d+}$, and the dopant phosphor ion is $Ce^{3+}$.

In a preferred embodiment of any of the eleventh to the fourteenth aspects of the invention, the phosphor-doped fluoroperovskite compound is selected from the group consisting of: $NaMgF_3$:$Pr^{3+}$; $NaMgF_3$:$Tb^{3+}$; $KMgF_3$:$Eu^{2+}$; $RbMgF_3$:$Eu^{2+}$; and $RbMgF_3$:$Ce^{3+}$.

In a further preferred embodiment of any of the eleventh to the fourteenth aspects of the invention, the phosphor-doped fluoroperovskite compound is selected from the group consisting of: $NaMgF_3$:0.1% $Pr^{3+}$; $NaMgF_3$:0.2% $Tb^{3+}$; $KMgF_3$:0.2% $Eu^{2+}$; $RbMgF_3$:0.2% $Eu^{2+}$; and $RbMgF_3$:0.2% $Ce^{3+}$.

In a preferred embodiment of any of the eleventh to the fourteenth aspects of the invention, the phosphor-doped fluoroperovskite compound is selected from the group consisting of: $NaMgF_3$:$Pr^{3+}$; $NaMgF_3$:$Tb^{3+}$; $KMgF_3$:$Eu^{2+}$; and $RbMgF_3$:$Ce^{3+}$.

In a further preferred embodiment of any of the eleventh to the fourteenth aspects of the invention, the phosphor-doped fluoroperovskite compound is selected from the group consisting of: $NaMgF_3$:0.1% $Pr^{3+}$; $NaMgF_3$:0.2% $Tb^{3+}$; $KMgF_3$:0.2% $Eu^{2+}$; and $RbMgF_3$:0.2% $Ce^{3+}$.

In one embodiment of any of the eleventh to the fourteenth aspects of the invention, at least part of the stored energy is released from the phosphor-doped fluoroperovskite compound upon optical stimulation in a wavelength range from about 200 nm to about 1000 nm. In one embodiment, the optical stimulation wavelength is from about 290 nm to about 350 nm. In a preferred embodiment, the optical stimulation wavelength is from about 300 nm to about 1000 nm. In one embodiment, the optical stimulation wavelength is about 470 nm. In a further preferred embodiment, the optical stimulation wavelength is in the near infrared (>700 nm). In a further preferred embodiment, the optical stimulation wavelength is about 875 nm.

Accordingly, in one embodiment of the thirteenth aspect of the invention, the at least one predetermined wavelength in step (c) is in a range from about 200 nm to about 1000 nm. In another embodiment, the wavelength is from about 290 nm to about 350 nm. In a preferred embodiment, the wavelength is from about 300 nm to about 1000 nm. In one embodiment, the wavelength is about 470 nm. In a further preferred embodiment, the wavelength is in the near infrared (>700 nm). In a further preferred embodiment, the wavelength is about 875 nm.

Accordingly, in one embodiment of the fourteenth aspect of the invention, the wavelength of the stimulating light in step (c) is in a range from about 200 nm to about 1000 nm. In another embodiment, the wavelength is from about 290 nm to about 350 nm. In a preferred embodiment, the wavelength is from about 300 nm to about 1000 nm. In one embodiment, the wavelength is about 470 nm. In a further preferred embodiment, the wavelength is in the near infrared (>700 nm). In a further preferred embodiment, the wavelength is about 875 nm.

In a preferred embodiment of any of the eleventh to the fourteenth aspects of the invention, the energy stored upon irradiation with the incident ionizing radiation is released as optically stimulated luminescence at a wavelength that is shorter than the optical stimulation wavelength.

Accordingly, in a preferred embodiment of the thirteenth aspect of the invention, the wavelength of the optically stimulated luminescence, the intensity and duration of which is measured in step (d), is shorter than the at least one predetermined wavelength in step (c).

Accordingly, in a preferred embodiment of the fourteenth aspect of the invention, the wavelength of the light emitted in step (d) is shorter than wavelength of the stimulating light in step (c).

In one embodiment of any of the eleventh to the fourteenth aspects of the invention, prior to irradiation with ionizing radiation, the phosphor-doped fluoroperovskite compound is ground; the ground compound is sintered at a temperature below the melting point of the compound; and the sintered phosphor-doped fluoroperovskite compound is cooled. In one embodiment, the cooling of the sintered phosphor-doped fluoroperovskite compound comprises quenching the compound.

In fifteenth aspect, the present invention also provides a dosimeter for detecting ionizing radiation by TSL, comprising a phosphor-doped fluoroperovskite compound, capable of storing at least part of the energy of incident ionizing; radiation, and releasing at least part of the stored energy upon heating, wherein the phosphor-doped fluoroperovskite compound is as defined for any of the sixth to the tenth aspects of the invention.

In a sixteenth aspect, the present invention also provides a radiation storage device comprising a phosphor-doped fluoroperovskite compound, capable of storing at least part of the energy of incident ionizing radiation, and releasing at least part of the stored energy upon heating, wherein the phosphor-doped fluoroperovskite compound is as defined for any of the sixth to the tenth aspects of the invention.

In a seventeenth aspect, the present invention provides a method of determining a dose of ionizing radiation comprising:
(a) providing a phosphor-doped fluoroperovskite compound, capable of storing at least part of the energy of incident ionizing radiation, and releasing at least part of the stored energy upon heating, wherein the phosphor-doped fluoroperovskite compound is as defined for any of the sixth to the tenth aspects of the invention;
(b) irradiating the phosphor-doped fluoroperovskite compound with ionizing radiation;
(c) heating the irradiated phosphor-doped fluoroperovskite compound in the dark;
(d) measuring the intensity and duration of the luminescence from the irradiated phosphor-doped fluoroperovskite compound at a predetermined temperature or within a predetermined temperature range or during a predetermined temperature ramp; and
(e) relating, by calibration procedures, the intensity and duration of the luminescence to the dose of ionizing radiation absorbed by the phosphor-doped fluoroperovskite compound.

In an eighteenth aspect, the present invention provides a method for recording and reproducing an ionizing radiation image comprising the steps of:
(a) providing a phosphor-doped fluoroperovskite compound, capable of storing at least part of the energy of incident ionizing radiation, and releasing at least part of the stored energy upon heating, wherein the phosphor-doped fluoroperovskite compound is as defined for any of the sixth to the tenth aspects of the invention;
(b) causing ionizing radiation to be incident upon the compound through an object to be imaged, so that the compound stores energy from the radiation;
(c) exposing the compound to heat to release the stored energy as emitted light;
(d) detecting the emitted light for imaging.

In one embodiment of any of the fifteenth to the eighteenth aspects of the invention, the phosphor-doped fluoroperovskite compound is $Na_{1-(x+x')}K_xRb_{x'}Mg_{1-y}Zn_yF_{3-z}Cl_z:Z^{d+}$, and the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment of any of the fifteenth to the eighteenth aspects of the invention, the phosphor-doped fluoroperovskite compound is $Na_{1-(x+x')}K_xRb_{x'}Mg_{1-y}Zn_yF_{3-z}Cl_z:Z^{d+}$, and the dopant phosphor ion is selected from the group consisting of: $Eu^{2+}$; $Pr^{3+}$; $Tb^{3+}$; and $Mn^{2+}$.

In a preferred embodiment of any of the fifteenth to the eighteenth aspects of the invention, the phosphor-doped fluoroperovskite compound is $Na_{1-(x+x')}K_xRb_{x'}Mg_{1-y}Zn_yF_{3-z}Cl_z:Z^{d+}$, and the dopant phosphor ion is $Eu^{2+}$ or $Mn^{2+}$.

In a preferred embodiment of any of the fifteenth to the eighteenth aspects of the invention, the phosphor-doped fluoroperovskite compound is $Na_{1-(x+x')}K_xRb_{x'}Mg_{1-y}Zn_yF_{3-z}Cl_z:Z^{d+}$, and the dopant phosphor ion is $Eu^{2+}$.

In a preferred embodiment of any of the fifteenth to the eighteenth aspects of the invention, the phosphor-doped fluoroperovskite compound is $Na_{1-(x+x')}K_xRb_{x'}Mg_{1-y}Zn_yF_{3-z}Cl_z:Z^{d+}$, and the dopant phosphor ion is $Mn^{2+}$.

In one embodiment of any of the fifteenth to the eighteenth aspects of the invention, the phosphor-doped fluoroperovskite compound is $Rb_{1-(x+x')}Na_xK_{x'}Mg_{1-y}Zn_yF_{3-z}Cl_z:Z^{d+}$, and the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment of any of the fifteenth to the eighteenth aspects of the invention, the phosphor-doped fluoroperovskite compound is $Rb_{1-(x+x')}Na_xK_{x'}Mg_{1-y}Zn_yF_{3-z}Cl_z:Z^{d+}$, and the dopant phosphor ion is $Eu^{2+}$ or $Mn^{2+}$.

In a preferred embodiment of any of the fifteenth to the eighteenth aspects of the invention, the phosphor-doped fluoroperovskite compound is $Rb_{1-(x+x')}Na_xK_{x'}Mg_{1-y}Zn_yF_{3-z}Cl_z:Z^{d+}$, and the dopant phosphor ion is $Mn^{2+}$.

In one embodiment of any of the fifteenth to the eighteenth aspects of the invention, the phosphor-doped fluoroperovskite compound is $Na_{1-(x+x')}K_xRb_{x'}Mg_{1-y}Zn_yF_{3-z}Cl_z:Z^{d+}$, and the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Sm^{2+}$; $Sm^{3+}$; $Pr^{3+}$; $Gd^{3+}$; and $Tb^{3+}$.

In a preferred embodiment of any of the fifteenth to the eighteenth aspects of the invention, the phosphor-doped fluoroperovskite compound is $Na_{1-(x+x')}K_xRb_{x'}Mg_{1-y}Zn_yF_{3-z}Cl_z:Z^{d+}$, and the dopant phosphor ion is $Pr^{3+}$ or $Tb^{3+}$.

In one embodiment of any of the fifteenth to the eighteenth aspects of the invention, wherein the phosphor-doped fluoroperovskite compound is $Rb_{1-(x+x')}Na_xK_{x+}Mg_{1-y}Zn_yF_{3-z}Cl_z:Z^{d+}$, and the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment of any of the fifteenth to the eighteenth aspects of the invention, the phosphor-doped fluoroperovskite compound is $Na_{1-(x+x')}K_xRb_{x'}Mg_{1-y}Zn_yF_{3-z}Cl_z:Z^{d+}$, and the dopant phosphor ion is $Pr^{3+}$.

In a preferred embodiment of any of the fifteenth to the eighteenth aspects of the invention, wherein the phosphor-doped fluoroperovskite compound is $Na_{1-(x+x')}K_xRb_{x'}Mg_{1-y}Zn_yF_{3-z}Cl_z:Z^{d+}$, the dopant phosphor ion is $Tb^{3+}$.

In a preferred embodiment of any of the fifteenth to the eighteenth aspects of the invention, the phosphor-doped fluoroperovskite compound is $Rb_{1-(x+x')}Na_xK_{x'}Mg_{1-y}Zn_yF_{3-z}Cl_z:Z^{d+}$, and the dopant phosphor ion is $Eu^{2+}$.

In one embodiment of any of the fifteenth to the eighteenth aspects of the invention, x, x', y and z are all about 0.

In one embodiment of any of the fifteenth to the eighteenth aspects of the invention, the phosphor-doped fluoroperovskite compound is $NaMgF_3: Z^{d+}$, and the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment of any of the fifteenth to the eighteenth aspects of the invention, the phosphor-doped fluoroperovskite compound is $NaMgF_3:Z^{d+}$, and the dopant phosphor ion is selected from the group consisting of: $Eu^{2+}$; $Pr^{3+}$; $Tb^{3+}$; and $Mn^{2+}$.

In a preferred embodiment of any of the fifteenth to the eighteenth aspects of the invention, the phosphor-doped fluoroperovskite compound is $NaMgF_3:Z^{d+}$, and the dopant phosphor ion is $Eu^{2+}$ or $Mn^{2+}$.

In a preferred embodiment of any of the fifteenth to the eighteenth aspects of the invention, the phosphor-doped fluoroperovskite compound is $NaMgF_3: Z^{d+}$, and the dopant phosphor ion is $Eu^{2+}$.

In a preferred embodiment of any of the fifteenth to the eighteenth aspects of the invention, the phosphor-doped fluoroperovskite compound is $NaMgF_3: Z^{d+}$, and the dopant phosphor ion is $Mn^{2+}$.

In one embodiment of any of the fifteenth to the eighteenth aspects of the invention, the phosphor-doped fluoroperovskite compound is $RbMgF_3:Z^{d+}$, and the dopant phosphor ion is selected from the group consisting of: the transition metal ions: $Cu^+$; $Ag^+$; $Mn^{2+}$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment of any of the fifteenth to the eighteenth aspects of the invention, the phosphor-doped fluoroperovskite compound is $RbMgF_3:Z^{d+}$, and the dopant phosphor ion is $Eu^{2+}$ or $Mn^{2+}$.

In a preferred embodiment of any of the fifteenth to the eighteenth aspects of the invention, the phosphor-doped fluoroperovskite compound is $RbMgF_3:Z^{d+}$, and the dopant phosphor ion is $Mn^{2+}$.

In a preferred embodiment of any of the fifteenth to the eighteenth aspects of the invention, the phosphor-doped fluoroperovskite compound is selected from the group consisting of: $NaMgF_3:Eu^{2+}$; $NaMgF_3:Pr^{3+}$; $NaMgF_3:Tb^{3+}$; $NaMgF_3:Mn^{2+}$; $RbMgF_3:Eu^{2+}$; and $RbMgF_3:Mn^{2+}$.

In a further preferred embodiment of any of the fifteenth to the eighteenth aspects of the invention, the phosphor-doped fluoroperovskite compound is selected from the group consisting of: $NaMgF_3:0.2\%$ $Eu^{2+}$; $NaMgF_3:0.1\%$ $Pr^{3+}$; $NaMgF_3:0.2\%$ $Tb^{3+}$; $NaMgF_3:0.2\%$ $Mn^{2+}$; $RbMgF_3:0.2\%$ $Eu^{2+}$; and $RbMgF_3:0.2\%$ $Mn^{2+}$.

In a further preferred embodiment of any of the fifteenth to the eighteenth aspects of the invention, the phosphor-doped fluoroperovskite compound is $NaMgF_3:0.2\%$ $Eu^{2+}$.

In a further preferred embodiment of any of the fifteenth to the eighteenth aspects of the invention, the phosphor-doped fluoroperovskite compound is $RbMgF_3:0.2\%$ $Eu^{2+}$.

In one embodiment of any of the fifteenth to the eighteenth aspects of the invention, the phosphor-doped fluoroperovskite compound is $NaMgF_3: Z^{d+}$, and the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Sm^{2+}$; $Sm^{3+}$; $Pr^{3+}$; $Gd^{3+}$; and $Tb^{3+}$.

In one embodiment of any of the fifteenth to the eighteenth aspects of the invention, the phosphor-doped fluoroperovskite compound is $RbMgF_3:Z^{d+}$, the dopant phosphor ion is selected from the group consisting of: the transition metal ions: $Cu^+$; $Ag^+$; $Mn^{3+}$; $Mn^{4+}$; and $Cr^{3+}$; and the rare earth metal ions: $Eu^{2+}$; $Sm^{2+}$; $Sm^{3+}$; $Pr^{3+}$; $Gd^{3+}$; and $Tb^{3+}$.

In a preferred embodiment of any of the fifteenth to the eighteenth aspects of the invention, the phosphor-doped fluoroperovskite compound is $NaMgF_3:Z^{d+}$, and the dopant phosphor ion is $Pr^{3+}$ or $Tb^{3+}$.

In a preferred embodiment of any of the fifteenth to the eighteenth aspects of the invention, the phosphor-doped fluoroperovskite compound is $NaMgF_3:Z^{d+}$, and the dopant phosphor ion is $Pr^{3+}$.

In a preferred embodiment of any of the fifteenth to the eighteenth aspects of the invention, the phosphor-doped fluoroperovskite compound is $NaMgF_3:Z^{d+}$, and the dopant phosphor ion is $Tb^{3+}$.

In a preferred embodiment of any of the fifteenth to the eighteenth aspects of the invention, the phosphor-doped fluoroperovskite compound is $RbMgF_3:Z^{d+}$, and the dopant phosphor ion is $Eu^{2+}$.

In a preferred embodiment of any of the fifteenth to the eighteenth aspects of the invention, the phosphor-doped fluoroperovskite compound is selected from the group consisting of: $NaMgF_3:Pr^{3+}$; $NaMgF_3:Tb^{3+}$; and $RbMgF_3:Eu^{2+}$.

In a further preferred embodiment of any of the fifteenth to the eighteenth aspects of the invention, the phosphor-doped fluoroperovskite compound is selected from the group consisting of: $NaMgF_3:0.1\%$ $Pr^{3+}$; $NaMgF_3:0.2\%$ $Tb^{3+}$; and $RbMgF_3:0.2\%$ $Eu^{2+}$.

In one embodiment of any of the fifteenth to the eighteenth aspects of the invention, prior to irradiation with ionizing radiation, the phosphor-doped fluoroperovskite compound is ground; the ground compound is sintered at a temperature below the melting point of the compound; and the sintered phosphor-doped fluoroperovskite compound is cooled. In one embodiment, the cooling of the sintered phosphor-doped fluoroperovskite compound comprises quenching the compound.

In one embodiment of the seventeenth aspect, the method further comprises a step, before the step of heating the irradiated phosphor-doped fluoroperovskite compound in the dark, of optically stimulating the irradiated phosphor-doped fluoroperovskite compound with a predetermined intensity of light comprising at least one predetermined wavelength and, optionally, measuring the intensity and duration of the optically stimulated luminescence from the irradiated phosphor-doped fluoroperovskite compound. In one embodiment, the optical stimulation is in a wavelength range from about 200 nm to about 1000 nm. In one embodiment, the optical stimulation wavelength is from about 290 nm to about 350 nm. In a preferred embodiment, the optical stimulation wavelength is from about 300 nm to about 1000 nm. In one embodiment, the optical stimulation wavelength is about 470 nm. In a further preferred embodiment, the optical stimulation wavelength is in the near infrared (>700 nm). In a further preferred embodiment, the optical stimulation wavelength is about 875 nm.

In one embodiment of the eighteenth aspect, the method further comprises a step, before the step of exposing the compound to heat to release the stored energy as emitted light, of optically stimulating the irradiated phosphor-doped fluoroperovskite compound with a predetermined intensity of light comprising at least one predetermined wavelength and, optionally, measuring the intensity and duration of the optically stimulated luminescence from the irradiated phosphor-doped fluoroperovskite compound. In one embodiment, the optical stimulation is in a wavelength range from about 200 nm to about 1000 nm. In one embodiment, the optical stimulation wavelength is from about 290 nm to about 350 nm. In a preferred embodiment, the optical stimulation wavelength is from about 300 nm to about 1000 nm. In one embodiment, the optical stimulation wavelength is about 470 nm. In a further preferred embodiment, the optical stimulation wavelength is in the near infrared (>700 nm). In a further preferred embodiment; the optical stimulation wavelength is about 875 nm.

In a nineteenth aspect, the present invention provides a method for preparing a phosphor-doped fluoroperovskite compound, capable of storing at least part of the energy of incident ionizing radiation, and releasing at least part of the stored energy upon optical stimulation or upon heating, wherein the phosphor-doped fluoroperovskite compound is as defined for any of the first to the tenth aspects of the invention, the method comprising the steps:
(a) providing a mixture of precursor compounds;
(b) heating the mixture to a temperature at or above the melting point of the mixture to form a homogenous melt; and
(c) cooling the melt to provide the phosphor-doped fluoroperovskite compound.

In an alternative embodiment, step (b) comprises heating the mixture to a temperature below the melting point of the mixture and sintering the mixture; and step (c) comprises cooling the sintered mixture to provide the phosphor-doped fluoroperovskite compound.

Preferably, one or both of steps (b) and (c) are carried out in an atmosphere having a low oxygen partial pressure. In one embodiment, the atmosphere having a low oxygen partial pressure is an argon atmosphere. In an alternative embodiment, the atmosphere is an argon-hydrogen atmosphere.

In one embodiment, the method further comprises the steps:
(d) grinding the phosphor-doped fluoroperovskite compound;
(e) sintering the ground compound at a temperature below the melting point of the compound; and
(f) cooling the sintered phosphor-doped fluoroperovskite compound.

In one embodiment, step (c) comprises cooling the melt to a temperature below the melting point of the phosphor-doped fluoroperovskite compound and then quenching the compound. In an alternative embodiment, step (c) comprises quenching the molten phosphor-doped fluoroperovskite compound.

In one embodiment, step (f) comprises quenching the sintered phosphor-doped fluoroperovskite compound.

In a twentieth aspect, the present invention provides a phosphor-doped fluoroperovskite compound, capable of storing at least part of the energy of incident ionizing radiation, and releasing at least part of the stored energy upon optical stimulation or upon heating, prepared substantially according to the method of the nineteenth aspect of the invention.

In other aspects, the present invention provides dosimeters for detecting ionizing radiation by OSL and/or by TSL, radiation storage devices, methods of determining a dose of ionizing radiation and methods for recording and reproducing an ionizing radiation image; all utilizing a phosphor-doped fluoroperovskite compound, capable of storing at least part of the energy of incident ionizing radiation, and releasing at least part of the stored energy upon optical stimulation or upon heating, wherein the compound is prepared substantially according to the method of the nineteenth aspect of the invention.

Specific and preferred embodiments of these other aspects are as recited above for any of the eleventh to the eighteenth aspects of the invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein with respect to the fluoroperovskite compound, the term "phosphor-doped" means that up to a few mole percent of the ions in the compound have been replaced with a different ion, which results in new properties. For example, in the fluoroperovskite compounds described in the examples, $NaMgF_3$:0.2% $Eu^{2+}$ means that 0.2% of the $Mg^{2+}$ ions are replaced with $Eu^{2+}$ ions.

In one embodiment, the mole percent of dopant phosphor ions replacing the $Mg^{2+}$ ions and $Zn^{2+}$ ions, if present, in the fluoroperovskite compound is between 0.001% and 10%. In a preferred embodiment, the mole percent of dopant phosphor ions is between 0.01% and 2%, more preferably between 0.01% and 1%, more preferably between 0.1% and 0.5%.

As used herein the term "quenching" means the rapid cooling of the phosphor-doped fluoroperovskite compound to a lower temperature. The quenching may proceed, for example, by contact with liquids or gases which are cooler than the molten or solid compound. Alternatively, the molten compound can be poured onto a colder metal surface or into a mold at the lower temperature to form the solid compound.

As used herein the term "storing" with respect to radiation means that, following irradiation of the phosphor-doped fluoroperovskite compound, part of the energy is stored in the form of trapped electrons and holes. Subsequent exposure of the compound to stimulating light or heat leads to detrapping of the trapped electrons and holes followed by energy transfer to the dopant phosphor ion and then emission of light from the phosphor ion.

The term "comprising" as used, in this specification means "consisting at least in part of". When interpreting each statement in this; specification that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

Although the present invention is broadly as defined above, those persons skilled in the art will appreciate that the invention is not limited thereto and that the invention also includes embodiments of which the following description gives examples.

BRIEF DESCRIPTION OF THE DRAWINGS

The invention will now be described with reference to the Figures in which.

DETAILED DESCRIPTION OF THE INVENTION

Figure 1:
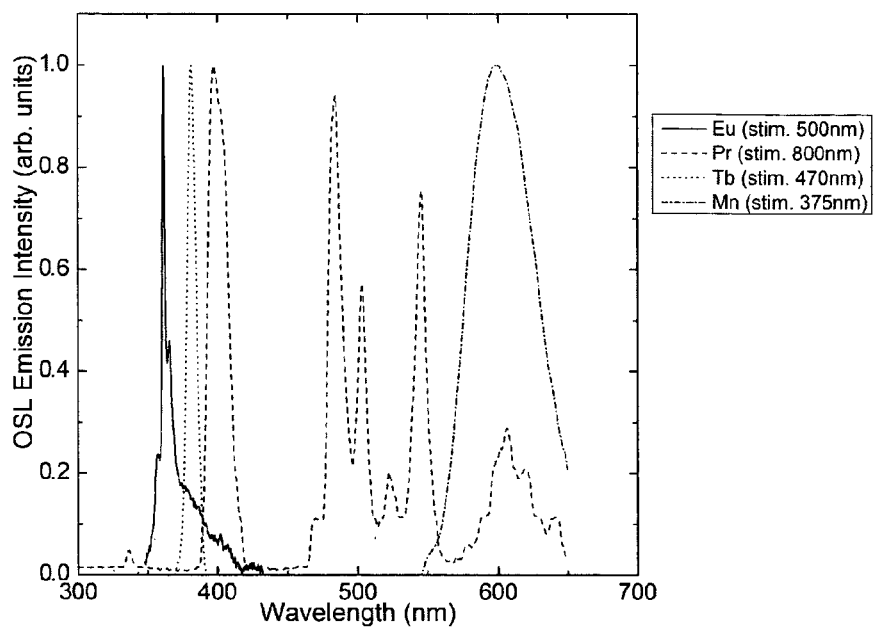
FIG. 1 shows the room temperature OSL emission from as-made $NaMgF_3$:0.2% $Eu^{2+}$, $NaMgF_3$:0.1% $Pr^{3+}$, $NaMg_3$:0.2% $Tb^{3+}$, and $NaMgF_3$:0.2% $Mn^{2+}$.

The present invention relates to fluoroperovskite compounds activated by a phosphor ion dopant that display OSL or TSL after exposure to ionizing radiation. Such compounds are particularly suitable for the measurement of ionizing radiation dosage by OSL and TSL, and can also be used as a phosphor for radiation imaging.

The present invention also relates to radiation dosimeters, imaging plates and other radiation monitoring devices based on the fluoroperovskite compounds.

Irradiation of the phosphor-doped fluoroperovskite compound leads to the excitation of electrons and holes that become trapped in the compound. The concentration of the trapped electrons and holes is related to the radiation dose and the spatial distribution of trapped electrons and holes can be used to generate a two-dimensional dose distribution profile. The spatial distribution and concentration of trapped electrons and holes can also represent a latent X-ray image for X-ray imaging or radiation dose distribution applications.

The stored dose or image information can be read out promptly or at a later time by conventional OSL or TSL methods.

For OSL read-out, the irradiated phosphor-doped fluoroperovskite compound is exposed to stimulating light, which leads to the recombination of the trapped electrons and holes and the emission of the light. The emitted light is known as OSL emission. The emitted light can be recorded as a function of time during continual stimulation, and the time integrated OSL emission intensity will be proportional to the radiation dose. It is also possible to stimulate the sample with weak stimulating light for a short period and record the OSL emission. The intensity can be related to the radiation dose, and this method enables the dose information to be periodically monitored.

For radiation imaging applications, in which the phosphor-doped fluoroperovskite compound is typically formed into a plate using methods known to those skilled in the art, the image can be read-out via a scanning stimulating beam or by stimulating the entire plate.

For TSL read-out, the irradiated phosphor-doped fluoroperovskite compound is heated at a rate that is typically between 0.01 K/s and 25 K/s. In one embodiment, the heating rate is about 1 K/s.

Heating leads to thermal excitation of the trapped carriers and electron-hole recombination followed by the emission of TSL light. The intensity and temperature dependence of the TSL emission can be related to the radiation dose.

The phosphor-doped fluoroperovskite compounds for OSL applications are selected from:

$Na_{1-(x+x')}K_xRb_{x'}Mg_{1-y}Zn_yF_{3-z}Cl_z:Z^{d+}$ wherein $Z^{d+}$ is the dopant phosphor ion and is selected from the group consisting of: the transition metal ions: Cu$^+$; Ag$^+$; Mn$^{2+}$; Mn$^{3+}$; Mn$^{4+}$; and Cr$^{3+}$; the rare earth metal ions: Eu$^{2+}$; Sm$^{2+}$; Sm$^{3+}$; Pr$^{3+}$; Gd$^{3+}$; and Tb$^{3+}$; and Tl$^+$; In$^+$; Ga$^+$; and Pb$^{2+}$; and wherein (x+x')≤0.1, y≤0.1 and z≤0.3;

$K_{1-(x+x')}Na_xRb_{x'}Mg_{1-y}Zn_yF_{3-z}Cl_z:Z^{d+}$ wherein $Z^{d+}$ is the dopant phosphor ion and is selected from the group consisting of: the transition metal ions: Cu$^+$; Ag$^+$; Mn$^{2+}$; Mn$^{3+}$; Mn$^{4+}$; and Cr$^{3+}$; the rare earth metal ions: Eu$^{2+}$; Sm$^{2+}$; Sm$^{3+}$; Pr$^{3+}$; Gd$^{3+}$; and Tb$^{3+}$; and Tl$^+$; In$^+$; Ga$^+$; and Pb$^{2+}$; and wherein (x+x')≤0.1, y≤0.1 and z≤0.3;

$Rb_{1-(x+x')}Na_xK_{x'}Mg_{1-y}Zn_yF_{3-z}Cl_z:Z^{d+}$ wherein $Z^{d+}$ is the dopant phosphor ion and is selected from the group consisting of: the transition metal ions: Cu$^+$; Ag$^+$; Mn$^{3+}$; Mn$^{4+}$; and Cr$^{3+}$; the rare earth metal ions: Eu$^{2+}$; Sm$^{2+}$; Sm$^{3+}$; Pr$^{3+}$; Ce$^{3+}$; Gd$^{3+}$; and Tb$^{3+}$; and Tl$^+$; In$^+$; Ga$^+$; and Pb$^{2+}$; and wherein (x+x')≤0.1, y≤0.1 and z≤0.3;

and mixtures of any two or more thereof.

The phosphor-doped fluoroperovskite compounds for TSL applications are selected from:

$Na_{1-(x+x')}K_xRb_{x'}Mg_{1-y}Zn_yF_{3-z}Cl_z$ wherein $Z^{d+}$ is the dopant phosphor ion and is selected from the group consisting of: the transition metal ions: Cu$^+$; Ag$^+$; Mn$^{2+}$; Mn$^{3+}$; Mn$^{4+}$; and Cr$^{3+}$; the rare earth metal ions: Eu$^{2+}$; Sm$^{2+}$; Sm$^{3+}$; Pr$^{3+}$; Gd$^{3+}$; and Tb$^{3+}$; and Tl$^+$; In$^+$; Ga$^+$; and Pb$^{2+}$; and wherein (x+x')≤0.1, y≤0.1 and z≤0.3;

$Rb_{1-(x+x')}Na_xK_{x'}Mg_{1-y}Zn_yF_{3-z}Cl_z:Z^{d+}$ wherein $Z^{d+}$ is the dopant phosphor ion and is selected from the group consisting of: the transition metal ions: Cu$^+$; Ag$^+$; Mn$^{2+}$; Mn$^{3+}$; Mn$^{4+}$; and Cr$^{3+}$; the rare earth metal ions: Eu$^{2+}$; Sm$^{2+}$; Sm$^{3+}$; Pr$^{3+}$; Gd$^{3+}$; and Tb$^{3+}$; and Tl$^+$; In$^+$; Ga$^+$; and Pb$^{2+}$; and wherein (x+x')≤0.1, y≤0.1 and z≤0.3;

and mixtures of any two or more thereof.

The phosphor-doped fluoroperovskite compounds useful in the invention are sensitive to X-rays, gamma-rays, beta particles, alpha particles and other forms of ionizing radiation.

The phosphor-doped fluoroperovskite compounds useful in the invention may be prepared from suitable precursor compounds by methods known to those persons skilled in the art.

Suitable precursor compounds include: the alkali metal fluorides: NaF; KF and RbF; $MgF_2$ and $ZnF_2$; and various dopant phosphor ion compounds.

A preferred method of preparation involves placing a mixture of the precursor compounds in a crucible. The mixture is then heated to form a homogeneous melt. Typically, the mixture of precursor compounds is heated to a temperature that is about 50° C. above the melting point of the mixture. However, lower or higher temperatures—as high as about 1200° C.—may also be used. The maximum temperature for a particular mixture will be determined by the vapor pressures of the individual precursor compounds.

Typically, the mixture is heated in an atmosphere having a low oxygen partial pressure. In a preferred embodiment, the mixture is heated in argon, but other gases and mixtures may be used including, but not limited to: dry nitrogen; argon-hydrogen; and nitrogen-hydrogen.

The mixture is held at or above the melting temperature for a period of time, typically at least 20 minutes. The temperature is then ramped down to room temperature. The resultant material is polycrystalline.

In an alternative embodiment, the phosphor-doped fluoroperovskite compound may be prepared by heating a mixture of the precursor compounds to a temperature which is below the melting point and sintering the mixture to form the compound.

In other embodiments, the phosphor-doped fluoroperovskite compound may be prepared by known methods of single crystallite synthesis—for example, the Bridgman method or the Czochralski process.

Generally, the precursor dopant phosphor ion compound will be selected such that the dopant phosphor ion has the desired valency. In some embodiments, the precursor compound will include dopant phosphor ions having a higher valency than that desired for incorporation in the phosphor-doped fluoroperovskite compound. For example, a $Eu^{3+}$ precursor (such as $Eu_2O_3$) may be used to prepare compounds in which the desired dopant phosphor ion is $Eu^{2+}$. In such embodiments, the mixture of precursor compounds may be heated in a reducing atmosphere, such as 95% argon-5% hydrogen, to ensure that the dopant phosphor ions are reduced to the desired valency.

The resultant phosphor-doped fluoroperovskite compound may be ground and then sintered at temperatures below the melting point and then quenched from temperatures as high as 1100° C. to optimize the response of the compound to ionizing radiation. This quenching procedure may also be applied to the as-made phosphor-doped fluoroperovskite compound, without the intermediate grinding and sintering.

In a preferred embodiment, the temperature of the phosphor-doped fluoroperovskite compound before quenching is less than about 200° C. below the melting point of the compound, and preferably close to the melting point.

Without wishing to be bound by theory, the grinding and sintering process is thought to lead to diffusivity of the fluorine vacancies and other defects, and to increase their concentration, in the phosphor-doped fluoroperovskite compound structure. Rapid quenching of the compound "freezes" these vacancies and defects, whereas slow cooling may lead to a decrease in the trap distribution, depth and type.

The phosphor-doped fluoroperovskite compound can also be ground into a fine powder and dispersed in a polymer to enable the formation of arbitrary shapes, including panels, and to ensure long term material stability.

The phosphor-doped fluoroperovskite compound useful in the present invention may be used to produce an ionizing radiation imaging device by combining the compound with a source of ionizing radiation, to irradiate the compound. Subsequent illumination with stimulating light, or heating, can be used to cause luminescence of the compound to create an image using conventional techniques.

The following examples are provided to illustrate the present invention and in no way limit the scope thereof.

EXAMPLES

Example 1

Four $NaMgF_3$ samples, doped with 0.2% $Eu^{2+}$, 0.2% $Mn^{2+}$, 0.1% $Pr^{3+}$ and 0.2% $Tb^{3+}$, respectively, were prepared. The samples were prepared from stoichiometric quantities of NaF and $MgF_2$ with appropriate concentrations of $EuF_3$, $MnF_2$, $PrF_3$ or $TbF_3$. The precursors were placed in a vitreous carbon crucible and heated in an argon atmosphere to 1070° C. That temperature was held for 120 minutes. The temperature was then cooled to 1030° C. at a rate of 1 K/min, then to 1010° C. at 2 K/hour. This was followed by furnace cooling to room temperature.

The room temperature OSL emission spectra after exposure to X-rays are shown in FIG. 1 for $NaMgF_3$:0.2% $Eu^{2+}$ (solid curve, stimulated at 500 nm), $NaMgF_3$:0.1% $Pr^{3+}$ (dashed curve, stimulated at 800 nm), $NaMgF_3$:0.2% $Tb^{3+}$ (dotted curve, stimulated at 470 nm), and $NaMgF_3$:0.2% $Mn^{2+}$ (dot-dash curve, stimulated 375 nm). The stimulation wavelength is longer than the emission wavelength for the samples doped with $Eu^{2+}$, $Pr^{3+}$ and $Tb^{2+}$. This is advantageous because excitation at wavelengths shorter than the emission wavelength can lead to photoluminescence from the fluorescent ion excited states. This will limit the minimum detectable dose. The OSL can be bleached by stimulating in the OSL excitation band and the time integrated OSL emission intensity is proportional to the radiation dose.

FIG. 2(a) is a plot of the TSL glow curve from the $Eu^{2+}$ doped sample at a heating rate of 1 K/s and after X-ray irradiation. FIG. 2(a) shows that this compound can also be used to measure the radiation dose by TSL.

Example 2

Figure 3:
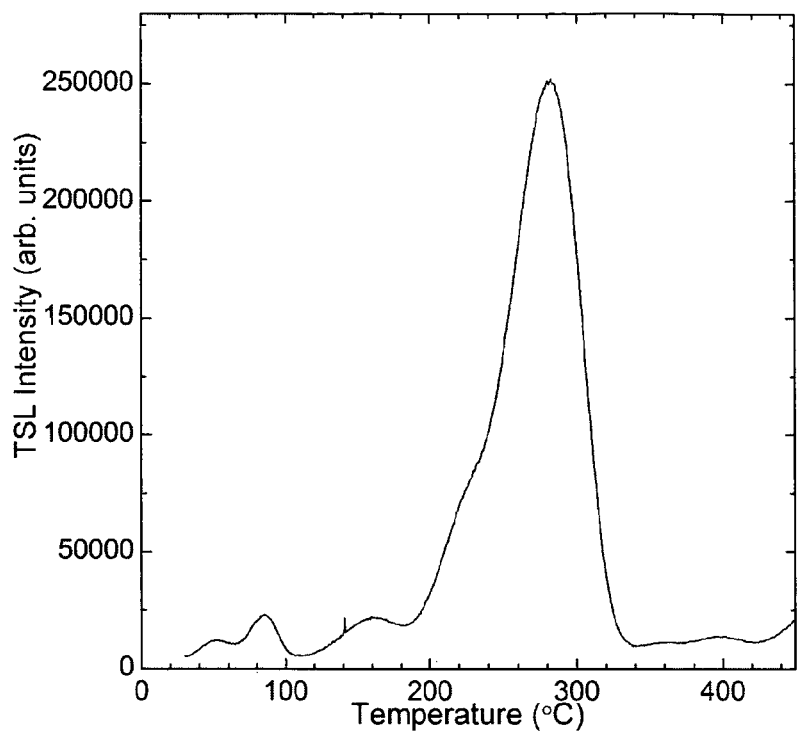
FIG. 3 shows the TSL after β irradiation of as-made NaMgF$_3$:0.02% Mn$^{2+}$.

A sample of $NaMgF_3$:0.02% $Mn^{2+}$ was prepared using the procedure in Example 1. The TSL data, at a heating rate of 1 K/s and after β irradiation, are plotted in FIG. 3. There is one main high temperature trap, which is a desirable property for a TSL dosimeter.

Figure 4:
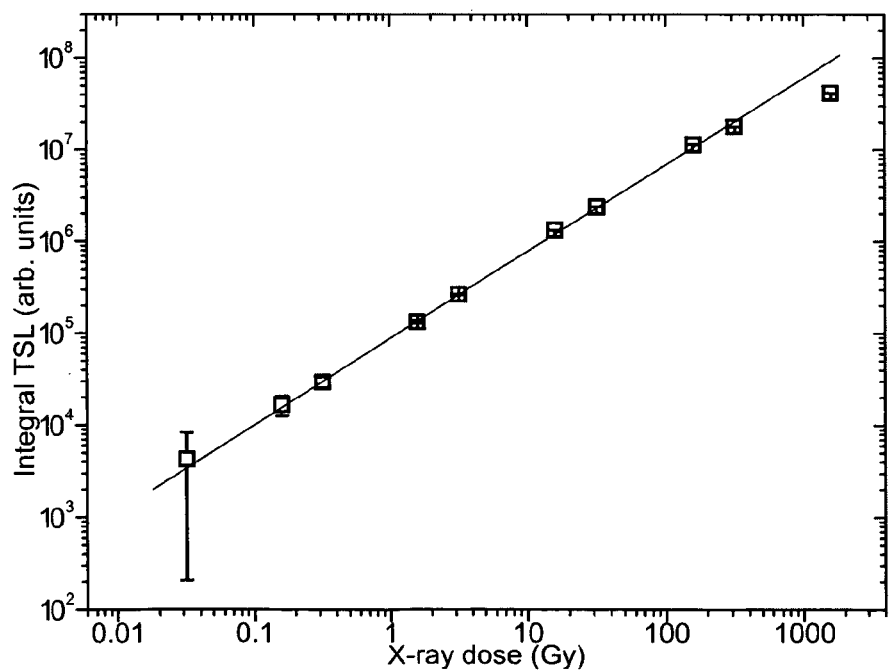
FIG. 4 shows the integrated TSL intensity of as-made NaMgF$_3$:0.02% Mn$^{2+}$ as a function of X-ray dose.

The TSL dose response to X-ray irradiation for another $NaMgF_3$:0.02% $Mn^{2+}$ sample is shown in FIG. 4. The dose response to X-rays is linear up to 300 Gy and increases for doses exceeding 1 kGy. This is a desirable property for a TSL dosimeter and the high dose response exceeds that of commercial TSL materials.

Example 3

A sample of $NaMgF_3$:0.2% $Eu^{2+}$, prepared using the procedure in Example 1, was ground, pressed into pellets and sintered at 900° C. in an air atmosphere for 2 hours. The sample was then quenched in liquid nitrogen.

The resulting OSL excitation and emission spectra after exposure to ionizing radiation were similar to those observed for the as-made sample.

Figure 5:
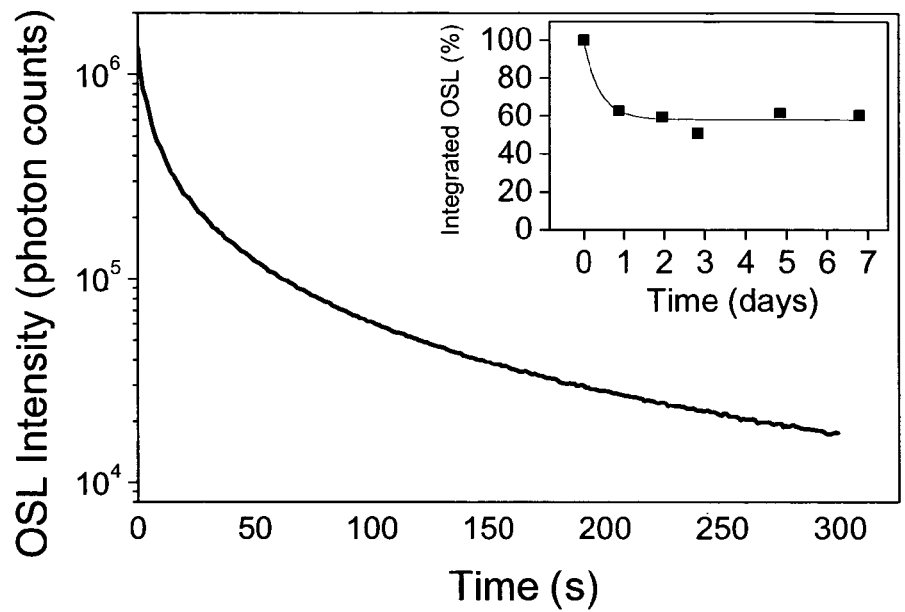
FIG. 5 shows the decay curve of the room temperature OSL from a sintered and liquid nitrogen quenched NaMgF$_3$:0.2% Eu$^{2+}$ sample, and the inset shows the dark decay.

The OSL can be bleached by stimulating with wavelengths ranging from the infrared to approximately 300 nm, and the time integrated OSL emission is proportional to the radiation dose. An example of the radiation dose read-out after 0.1 Gy β irradiation is shown in FIG. 5. The OSL was stimulated by a blue LED centered at 470 nm. The emitted light was passed through a Hoya U-340 UV bandpass glass filter and detected with a photomultiplier tube. It can be seen that there is rapid bleaching, which a desirable characteristic for OSL dosimeters.

The dark decay is shown in the inset to FIG. 5, where the integrated OSL is plotted for different times after the radiation dose. There is a small dark decay for times less than 24 hours and the dose information is stable after 1 day. The observed dark decay may be attributable to the specific sintering and annealing process used for this sample and does not reflect the dark decay observed for as-made material.

Figure 2:
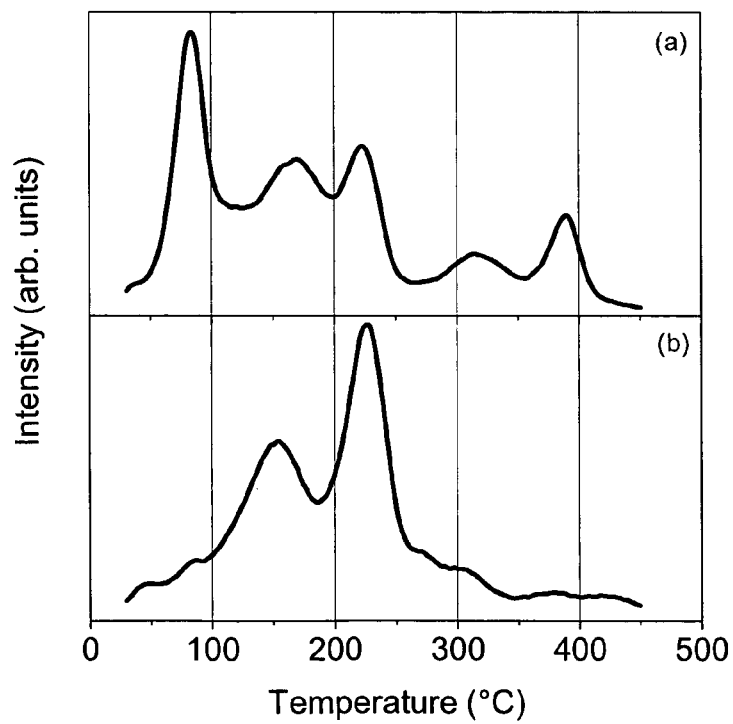
FIG. 2 (a) shows the TSL after X-ray irradiation of as-made $NaMgF_3$:0.2% $Eu^{2+}$ and (b) shows the TSL after X-ray irradiation of a sintered and liquid nitrogen quenched $NaMgF_3$:0.2% $Eu^{2+}$ sample.

The TSL data at a heating rate of 1 K/s and after X-ray irradiation are plotted in FIG. 2(*b*). Compared to the data for as-made $NaMgF_3$:0.2% $Eu^{2+}$, which are shown in FIG. 2(*a*), the TSL data also show a significant reduction for temperatures below 100° C. It should be noted that it is these shallow traps that lead to the afterglow and initial decrease in the dark decay in the as-made samples. It is also apparent that sintering and quenching lead to a significant decrease in the TSL glow curves for temperatures above 300° C. This indicates that sintering and quenching leads to a reduction in the density of deep traps. A low concentration of deep traps is desirable for OSL dosimeters because deep traps require high read-out intensities.

Example 4

$KMgF_3$ doped with 0.2% $Eu^{2+}$ was prepared from stoichiometric quantities of KF and $MgF_2$ with an appropriate concentration of $EuF_3$. The precursors were placed in a platinum crucible and heated in an argon atmosphere to 1100° C. That temperature was held for 120 minutes. The temperature was then cooled to 1080° C. at a rate of 1 K/min, then to 1060° C. at 2 K/hour. This was followed by furnace cooling to room temperature.

Figure 6:
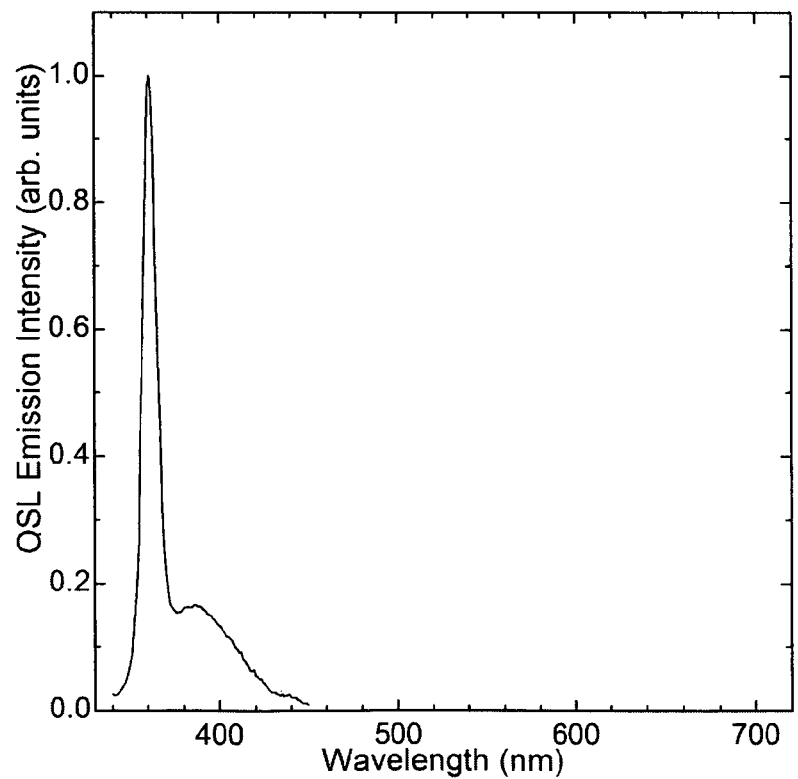
FIG. 6 shows the room temperature OSL emission from KMgF$_3$:0.2% Eu$^{2+}$.
Figure 7:
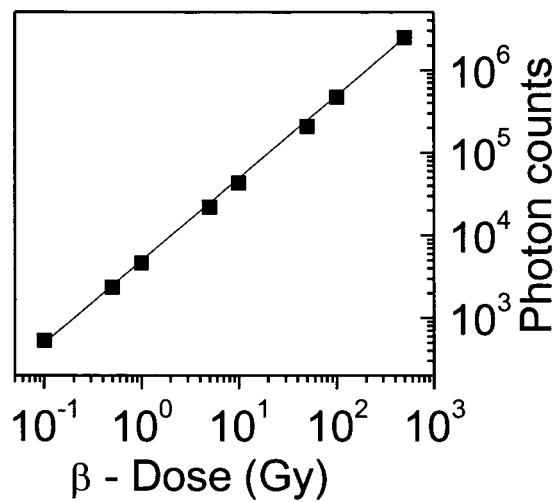
FIG. 7 is a plot of the time integrated room temperature OSL intensity from KMgF$_3$:0.2% Eu$^{2+}$ against the β radiation dose.

The room temperature OSL emission spectra, after X-ray irradiation and stimulation at 450 nm, are shown in FIG. 6. The dose response is shown FIG. 7, which is a plot of the time integrated OSL intensity against the radiation dose. The response is linear up to kGy, which is desirable for a OSL dosimeter.

Example 5

$RbMgF_3$ doped with 0.2% $Eu^{2+}$ and 0.2% $Ce^{3+}$ were prepared from stoichiometric quantities of RbF and $MgF_2$ with appropriate concentrations of $EuF_3$ or $CeF_3$. The precursors were placed in a vitreous carbon crucible and heated in an argon atmosphere to 970° C. That temperature was held for 120 minutes. The temperature was then cooled to 920° C. at a rate of 1 K/min, then to 900° C. at 2 K/hour. This was followed by furnace cooling to room temperature.

Figure 8:
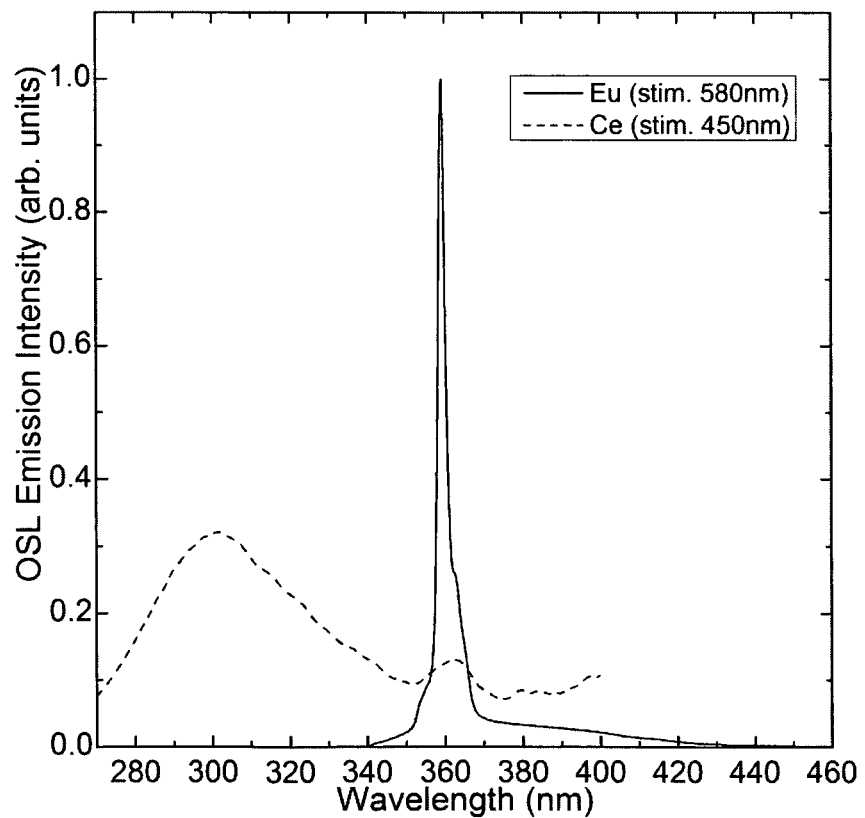
FIG. 8 shows the room temperature OSL emission after X-ray irradiation of RbMgF$_3$:0.2% Eu$^{2+}$ and RbMgF$_3$:0.2% Ce$^{3+}$.

The room temperature OSL emission spectra after X-ray irradiation are shown in FIG. 8 for $RbMgF_3$:0.2% $Eu^{2+}$ (solid curve, stimulated at 580 nm) and $RbMgF_3$:0.2% $Ce^{3+}$ (dashed curve, stimulated at 450 nm).

Figure 9:
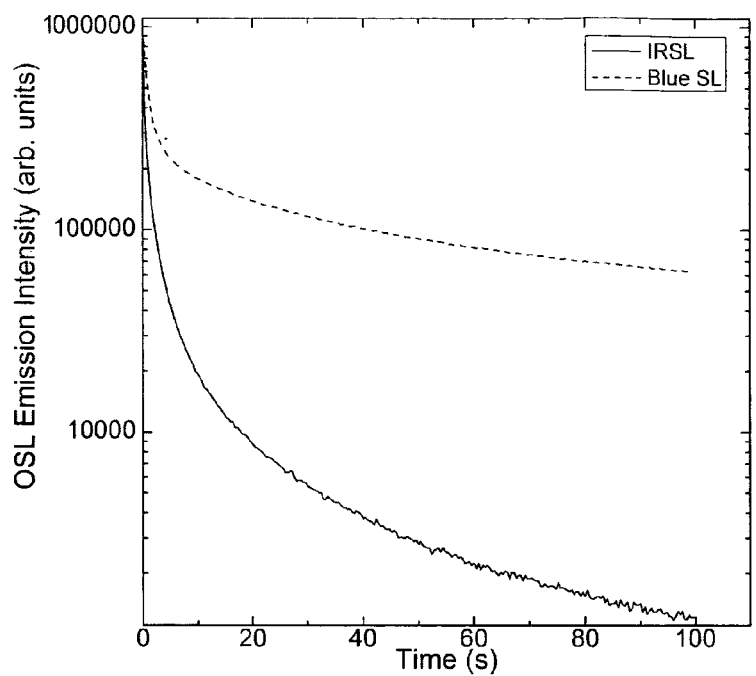
FIG. 9 shows the room temperature OSL decay curves after β irradiation for RbMgF$_3$:0.2% Eu$^{2+}$ during continual stimulation with an infrared LED or a blue LED.

The dose read-out can be obtained by continual stimulation and detection of the emitted light. This is shown in FIG. 9 where the OSL emission intensity from $RbMgF_3$:0.2% $Eu^{2+}$ is plotted during continual stimulation with an infrared LED centered at 875 nm (IRSL, solid curve) or a blue LED centered at 470 nm (Blue SL, dashed curve) after 0.1Gy irradiation.

Figure 10:
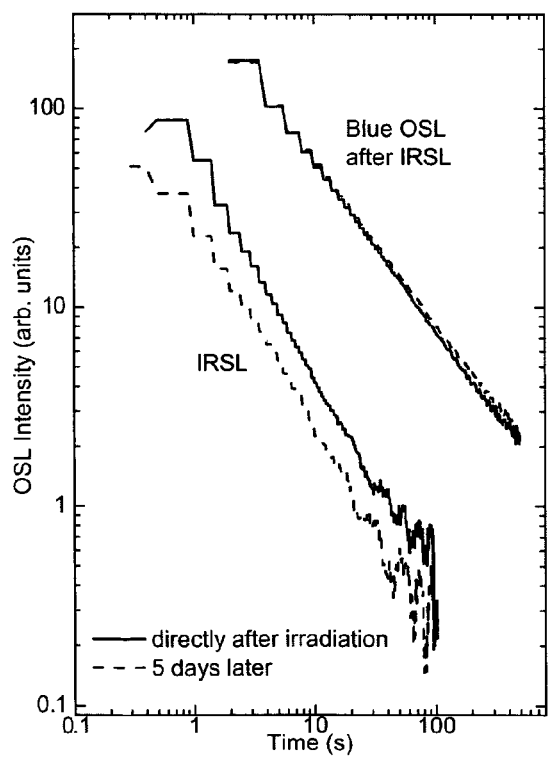
FIG. 10 shows the room temperature OSL decay curve for RbMgF$_3$:0.2% Eu$^{2+}$ after γ-irradiation and immediate stimulation with light above 435 nm or 715 nm and with a five day delay between irradiation and stimulation.

FIG. 10 shows the dose read-out for $RbMgF_3$:0.2% $Eu^{2+}$ after irradiation with a γ-ray source (60 keV) to a dose of approximately 400 mGy. FIG. 10 shows the infrared stimulated luminescence (IRSL) decay when stimulating with light above 715 nm immediately after irradiation and with a five day delay between irradiation and stimulation. FIG. 10 also shows the OSL decay when stimulating with light above 435 nm immediately after irradiation and with a five day delay between irradiation and stimulation. These data show that partial dose information can be obtained by stimulating with light from the blue to the infrared. It is also possible to read-out the dose information with wavelengths as low as 300 nm, provided that suitable emission and detection optical filters are used.

Figure 11:
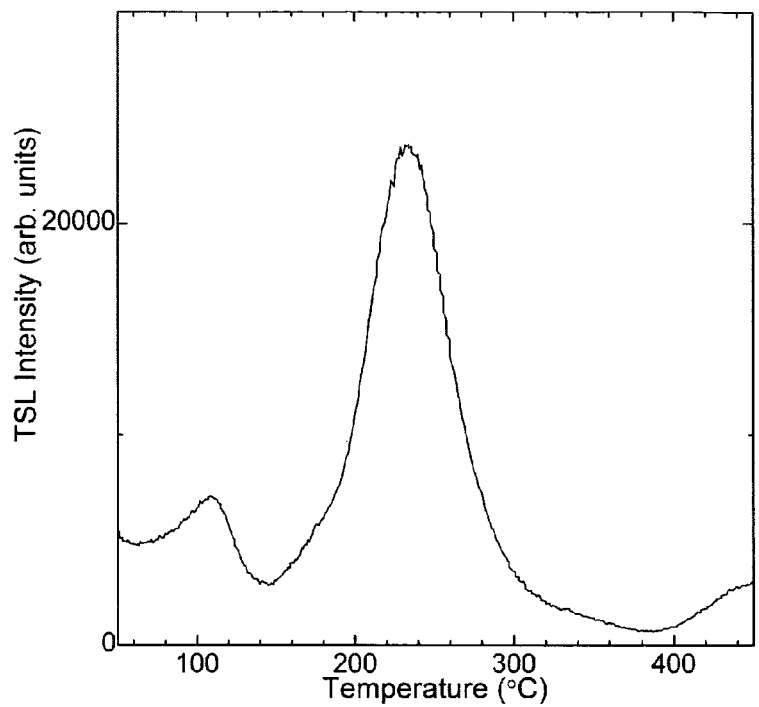
FIG. 11 shows the TSL from RbMgF$_3$:0.2% Eu$^{2+}$.

The radiation dose can also be obtained by TSL. This is shown in FIG. 11, which is a plot of the TSL data for $RbMgF_3$:0.2% $EU^{2+}$, after X-ray irradiation with a temperature ramp of 1 K/s.

Figure 12:
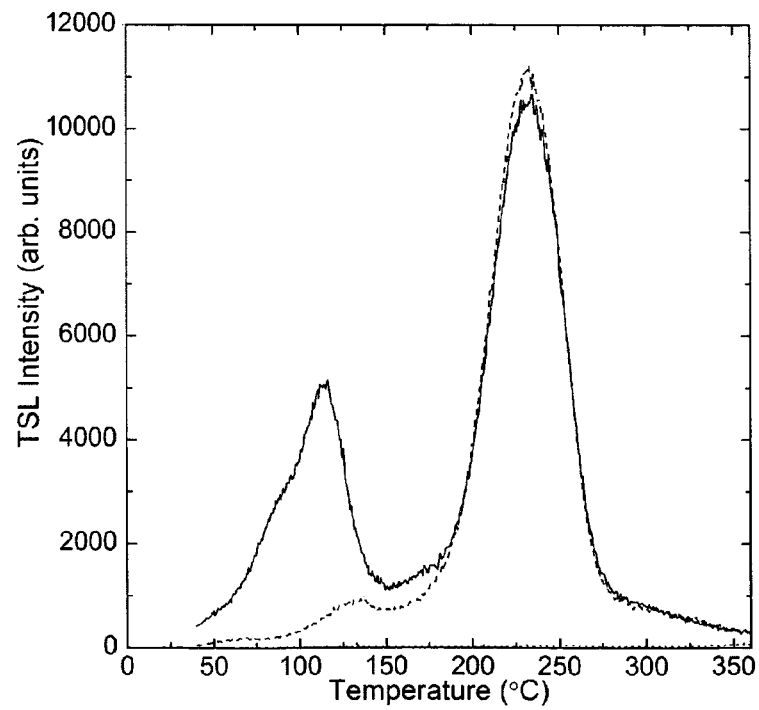
FIG. 12 shows the TSL from RbMgF$_3$:0.2% Eu$^{2+}$ after X-ray irradiation both with and without illumination with an infrared LED.

FIG. 12 is a comparison of the TSL data for $RbMgF_3$:0.2% $Eu^{2+}$ after X-ray irradiation (solid curve) and the TSL data after a similar X-ray dose and illumination with an infrared LED centered at 875 nm (dashed curve). This comparison shows that the material can be used as a TSL dosimeter and that infrared stimulation depopulates the traps associated with the low temperature peaks that are also responsible for the initial dark decay.

The radiation sensitivity of $RbMgF_3$:0.2% $Eu^{2+}$ was compared with that of a commercial $BaFBr:Eu^{2+}$ storage phosphor plate (AGFA MD30). Samples of approximately the same area (2.1×4.5 $mm^2$) and thickness (0.7 mm) were prepared. These dimensions were chosen to match the spot size of the excitation light of a Hitachi fluorescence spectrometer with a band pass of 20 nm. The samples were then subjected to a dose of 5.4 mGy by irradiation with an $^{241}$Am source for 5 minutes at a distance of approximately 2 cm. The OSL data were obtained using 633 nm excitation light with an OG590 filter and detecting at 395 nm with BG18 and UG5 filters for the imaging plate sample (for which the OSL emission occurs at 395 nm), and 0th order light from the excitation monochromator with a GG435 filter and detecting at 360 nm with BG18, UG11 and UG1 filters for the $RbMgF_3$:0.2% $Eu^{2+}$ sample. The emission spectra were not corrected for the excitation intensity, so the detected signal was a measure of the total OSL yield. The signals, integrated over the first 100 s (more than 90% of the signal was depleted in all cases), were measured relative to the value obtained for the imaging plate. The $RbMgF_3$:0.2% $Eu^{2+}$ sample was found to have a relative conversion efficiency of 32%.

Example 6

Figure 13:
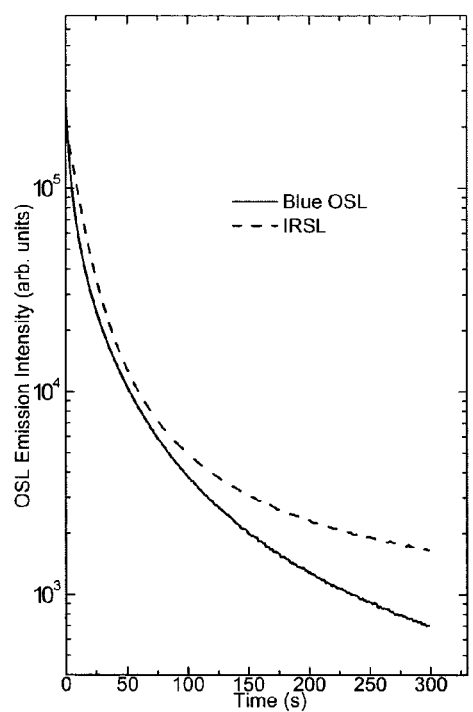
FIG. 13 shows the room temperature OSL decay curves for NaMgF$_3$:0.2% Eu$^{2+}$ after β irradiation and stimulation with an infrared LED or a blue LED.

A sample of $NaMgF_3$:0.2% $Eu^{2+}$ was prepared using the procedure in Example 1. The sample was β-irradiated (100 mGy) and the OSL emission recorded as a function of time during continual OSL stimulation with an infrared LED centered at 875 nm. The irradiation was repeated and the OSL emission recorded as a function of time during continual OSL stimulation with a blue LED centered at 470 nm. The room temperature OSL decay curves are shown in FIG. 13, which shows that a wide range of wavelengths can be used to read-out part or all of the dose information.

Figure 14:
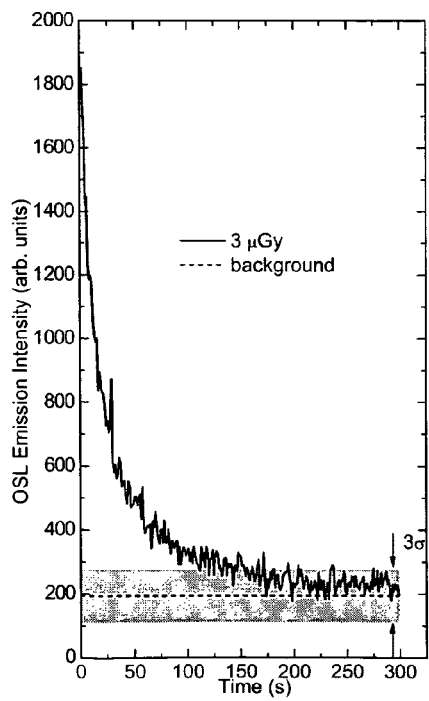
FIG. 14 shows the room temperature OSL decay curve for NaMgF$_3$:0.2% Eu$^{2+}$ after β irradiation and stimulation with a blue LED.

The OSL decay from a 28 mg sample after 3 μGy β irradiation is plotted in FIG. 14, which shows the OSL emission intensity as a function of time during continual stimulation with a blue LED centered at 470 nm. It shows the sensitivity of this material to ionizing radiation.

Figure 15:
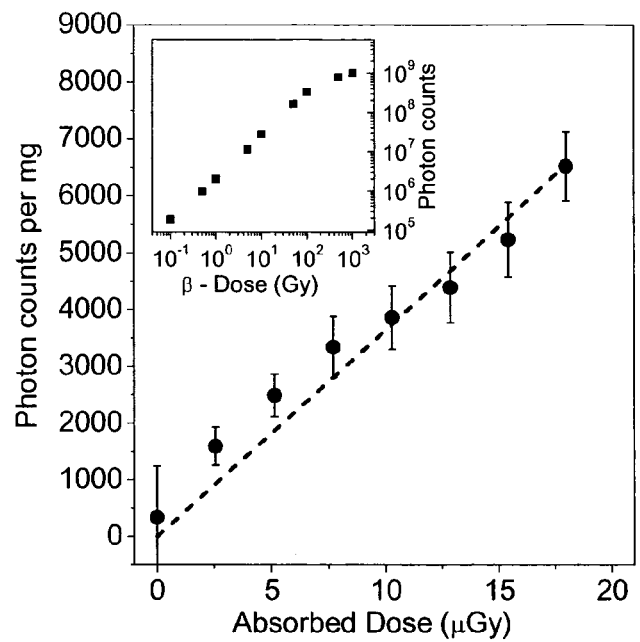
FIG. 15 is a plot of the time integrated room temperature OSL intensity after X-ray irradiation of a sintered and liquid nitrogen quenched NaMgF$_3$:0.2% Eu$^{2+}$ sample and stimulation with a blue LED, and the inset shows the time integrated OSL intensity for high β radiation doses.

The time integrated OSL signal is proportional to the radiation dose. FIG. 15 is a plot of the time integrated room temperature OSL intensity against the radiation dose after X-ray irradiation. FIG. 15 shows that the OSL response is linear for relatively low doses. The inset shows the dose response to higher X-ray doses. It shows that the dose response is linear to 100 Gy and that there is still a dose response to 1 kGy. This is in contrast to $Al_2O_3$:C where the dose response saturates at approximately 100 Gy. A wide range of dose response and a high dose limit is very desirable in OSL dosimeters, which can also be used for radiation therapy as well as non-destructive testing. There is negligible fading after 24 hours.

Figure 16:
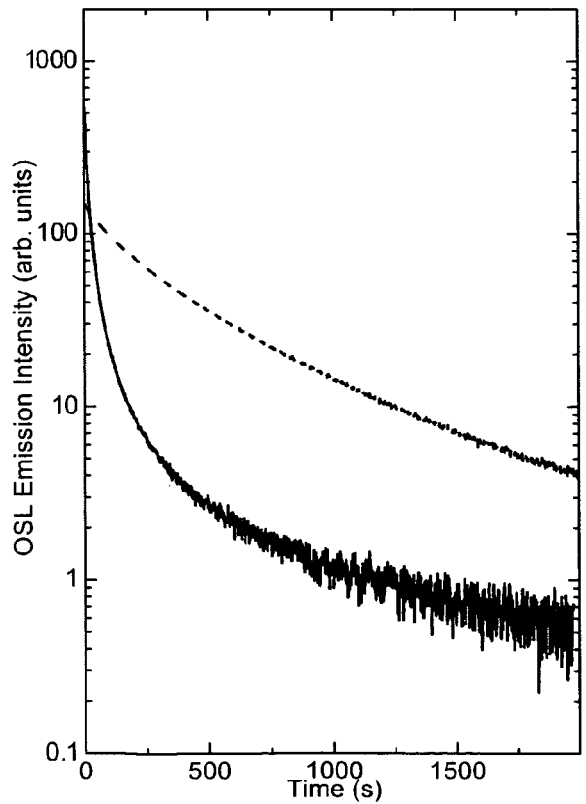
FIG. 16 shows the room temperature OSL decay curve for NaMgF$_3$:0.2% Eu$^{2+}$ and Al$_2$O$_3$:C after X-ray irradiation and during constant stimulation.

FIG. 16 compares the OSL emission intensity as a function of time for $NaMgF_3$:0.2% $Eu^{2+}$ (solid curve) and a transparent $Al_2O_3$:C dosimeter sample obtained from Landauer (dashed curve). A direct comparison with the industry standard OSL material $Al_2O_3$:C is not straightforward because of the differences in the stimulation and emission characteristics. The main emission of $Al_2O_3$:C occurs around 420 nm, and the stimulation maximum appears in the same wavelength region, but extends to red and infrared wavelengths.

For comparison, rectangular samples of 2.5×4.5 mm$^2$ and 0.5 mm thickness were cut and irradiated with X-rays to approximately 10 Gy. OSL read-out was performed in a Hitachi fluorescence spectrometer. The beam width using a stimulation band pass was wide enough to cover the total sample areas, thus providing complete dose read-out. For $Al_2O_3$:C, the excitation monochromator was set to 560 nm, and the emission monochromator to 420 nm. Additional wavelength separation was provided by inserting a GG495 filter in front of the excitation aperture and a BG3 filter in front of the detection aperture. $NaMgF_3$:0.2% $Eu^{2+}$ was read out with 425 nm stimulation, 360 nm emission and GG400 and UG11 filters, respectively.

The stimulation efficiency in this setup was much higher for $NaMgF_3$:0.2% $Eu^{2+}$. While the initial OSL intensity of $NaMgF_3$:0.2% $Eu^{2+}$ is approximately a factor of 4 higher than that of $Al_2O_3$:C, the time integrated intensity is approximately a factor of 4 smaller. Without taking into account the detector characteristics, these values are not very significant, but show that the sensitivity of both materials is in the same order of magnitude.

Example 7

$RbMgF_3$:$Mn^{2+}$ doped with different concentrations of $Mn^{2+}$ were prepared from stoichiometric quantities of RbF and $MgF_2$ with appropriate concentrations of $MnF_2$. The precursors were placed in a vitreous carbon crucible and heated in an argon atmosphere to 970° C. That temperature was held for 120 minutes. The temperature was then cooled to 920° C. at a rate of 1 K/min, then to 900° C. at 2 K/hour. This was followed by furnace cooling to room temperature.

Sintered pellets were prepared by grinding part of each sample and pressing into a disc using a die. They were then sintered at 880° C. for 3 hours in argon and then furnace cooled to room temperature.

Figure 17:
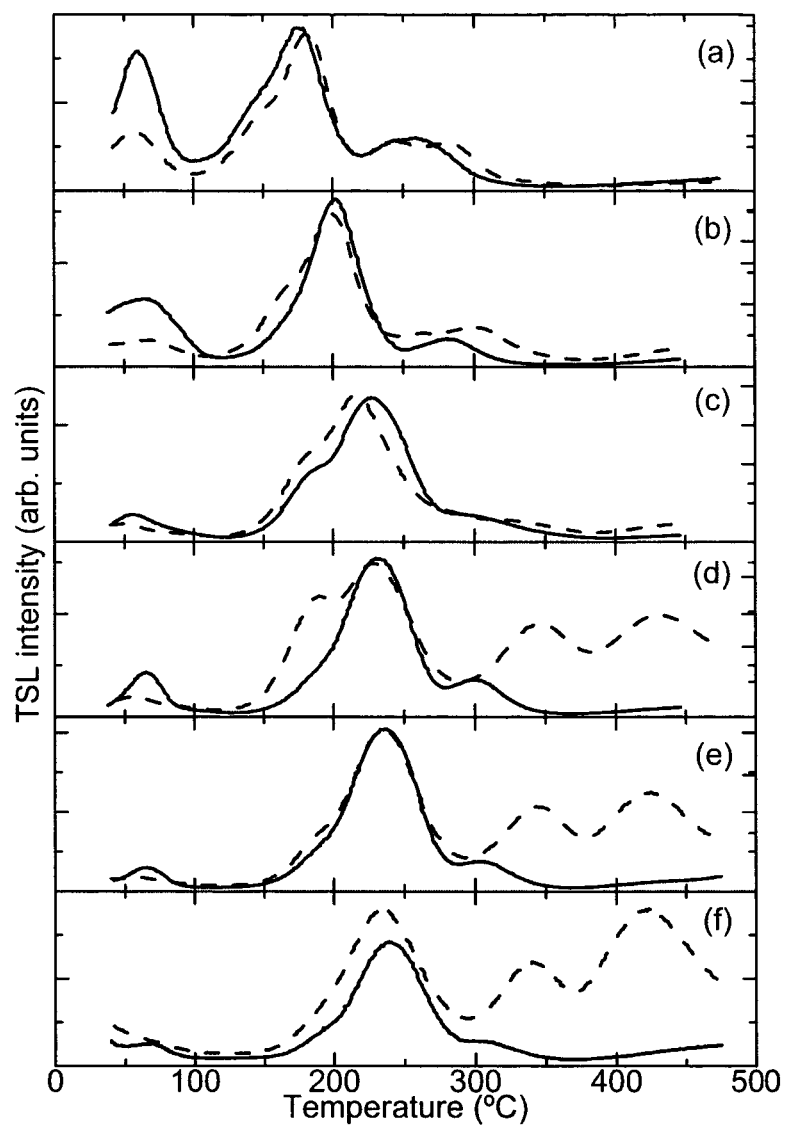
FIG. 17 shows the TSL, after a brief exposure to X-rays, from as-made and sintered RbMgF$_3$ doped with nominal Mn$^{2+}$ concentrations of: (a) 5%; (b) 2%; (c) 0.7%; (d) 0.2%; (e) 0.05%; and (f) 0%.

The TSL data for the as-made (solid curves) and sintered (dashed curves) samples after a short exposure to X-rays are shown in FIG. 17. The nominal $Mn^{2+}$ nominal concentrations were: (a) 5%; (b) 2%; (c) 0.7%; (d) 0.2%; (e) 0.05%; and (f) 0%. The ramp rate was 1 K/s. These data show that sintering can result in a reduction in the relative intensity of the low temperature peaks, which is advantageous for a TSL dosimeter.

Conclusions

The fluoroperovskite compounds described in these Examples have a number of advantages over materials currently used in dosimetry applications and as storage phosphors. For example, $RbMgF_3$:$Eu^{2+}$ has a higher OSL sensitivity to ionizing radiation than $Al_2O_3$:C and it is slightly less than that found for a commercial X-ray storage phosphor plate comprising $BaFBr$:$Eu^{2+}$. However, unlike the imaging plate, the dose information does not degrade, even for times as long at 24 hours.

Infrared stimulation of $RbMgF_3$:$Eu^{2+}$ ensures that the exciting light is far removed from the emitted light and, hence, the minimal detectable dose is lower because of the reduced leakage into the detector from the stimulating light. If the detector is a photomultiplier detector with photon counting, then infrared stimulation enables the OSL emission to be detected without the need for optical filters. This is because a sufficiently long infrared stimulation wavelength, which is not detected by the photomultiplier, can be selected.

$KMgF_3$:$Eu^{2+}$ has a linear dose response to nearly 1000 Gy. This is significantly greater than the linear dose range reported for the OSL dosimeter material $Al_2O_3$:C or even for TSL dosimeters.

$NaMgF_3$:$Mn^{2+}$ has a higher TSL sensitivity and higher maximum detectable dose limit than TLD-100 (LiF:Mg,Ti). The effective afoftiic number of $NaMgF_3$ is lower than that of $Al_2O_3$, which is advantageous for personal dosimetry.

The conversion efficiency of $NaMgF_3$:$Eu^{2+}$ is slightly less than that of $Al_2O_3$:C but $NaMgF_3$:$Eu^{2+}$ has a higher maximum recordable dose limit. Furthermore, most of the dose information can be read out via infrared stimulation and the peak OSL emission wavelength matches that of photomultiplier tube detectors. Advantageously, this enables highly sensitive dosimeter measurements using infrared stimulation above 650 nm without requiring optical filters as well as photon counting using a photomultiplier to detect the OSL emission at the peak of the photomultiplier tube sensitivity.

INDUSTRIAL APPLICATION

The present invention provides fluoroperovskite compounds that can be used in, for example, OSL and TSL personal dosimeters to measure the biological exposure to harmful ionizing radiation, and in medical applications to measure the dose during radiation therapy.

The fluoroperovskite compounds may also be used in the manufacture of radiation imaging plates for X-rays, gamma-rays and thermal neutrons for medical and non-destructive testing applications where a slow dark decay of the image is required. Such imaging plates may be used, for example, in medical X-ray imaging in remote locations where the image is read out at a central location, and in gamma-ray or X-ray imaging of critical valves or pipes in remote locations where the read-out is done up to two or more weeks later.

It is not the intention to limit the scope of the invention to the above-mentioned examples only. As would be appreciated by a skilled person in the art, many variations are possible without departing from the scope of the invention as set out in the accompanying claims.

The invention claimed is:

1. A phosphor-doped fluoroperovskite compound, wherein the compound stores at least part of the energy of incident ionizing radiation, and releases at least part of the stored energy upon optical stimulation, and wherein the phosphor-doped fluoroperovskite compound is selected from the group consisting of:

$NaMgF_3:Z^{d+}$ wherein $Z^{d+}$ is the dopant phosphor ion and is selected from the group consisting of: the transition metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$;

$KMgF_3:Z^{d+}$ wherein $Z^{d+}$ is the dopant phosphor ion and is selected from the group consisting of: the transition metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and $RbMgF_3:Z^{d+}$ wherein $Z^{d+}$ is the dopant phosphor ion and is selected from the group consisting of: the transition metal ions: $Cu^+$; $Ag^+$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Ce^{3+}$; $Gd^{3+}$; and $Tb^{3+}$; and $Tl^+$; $In^+$; $Ga^+$; and $Pb^{2+}$;

and mixtures of any two or more thereof.

2. The phosphor-doped fluoroperovskite compound, as claimed in claim 1, selected from the group consisting of: $NaMgF_3:Eu^{2+}$; $NaMgF^3:Pr^{3+}$; $NaMgF^3:Tb^{3+}$; $NaMgF^3:Mn^{2+}$; $KMgF^3:Eu^{2+}$; $RbMgF^3:Eu^{2+}$; and $RbMgF^3:Ce^{3+}$.

3. The phosphor-doped fluoroperovskite compound, as claimed in claim 1, wherein the mole percent of dopant phosphor ions replacing the $Mg^{2+}$ ions in the fluoroperovskite compound is between 0.001% and 10%, between 0.01% and 2%, between 0.01% and 1%, or between 0.1% and 0.5%.

4. A phosphor-doped fluoroperovskite compound, wherein the compound stores at least part of the energy of incident ionizing radiation, and releases at least part of the stored energy upon heating, and wherein the phosphor-doped fluoroperovskite compound is selected from the group consisting of:

$NaMgF_3:Z^{d+}$ wherein $Z^{d+}$ is the dopant phosphor ion and is selected from the group consisting of: the transition metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$;

$RbMgF_3:Z^{d+}$ wherein $Z^{d+}$ is the dopant phosphor ion and is selected from the group consisting of: the transition metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$;

and mixtures of any two or more thereof.

5. The phosphor-doped fluoroperovskite compound, as claimed in claim 4, selected from the group consisting of: $NaMgF_3:Eu^{2+}$; $NaMgF_3:Pr^{3+}$; $NaMgF_3:Tb^{3+}$; $NaMgF_3:Mn^{2+}$; $RbMgF_3:Eu^{2+}$; and $RbMgF_3:Mn^{2+}$.

6. The phosphor-doped fluoroperovskite compound, as claimed in claim 4, wherein the mole percent of dopant phosphor ions replacing the $Mg^{2+}$ ions in the fluoroperovskite compound is between 0.001% and 10%, between 0.01% and 2%, between 0.01% and 1%, or between 0.1% and 0.5%.

7. A dosimeter for detecting ionizing radiation by OSL, comprising a phosphor-doped fluoroperovskite compound, wherein the compound stores at least part of the energy of incident ionizing radiation, and releases at least part of the stored energy upon optical stimulation, as claimed in claim 1.

8. A radiation storage device comprising a phosphor-doped fluoroperovskite compound, wherein the compound stores at least part of the energy of incident ionizing radiation, and releases at least part of the stored energy upon optical stimulation, as claimed in claim 1.

9. The dosimeter as claimed in claim 7 wherein the phosphor-doped fluoroperovskite compound is selected from the group consisting of: $NaMgF_3:Eu^{2+}$; $NaMgF_3:Pr^{3+}$; $NaMgF_3:Tb^{3+}$; $NaMgF_3:Mn^{2+}$; $KMgF_3:Eu^{2+}$; $RbMgF_3:Eu^{2+}$; and $RbMgF_3:Ce^{3+}$.

10. The radiation storage device as claimed in claim 8, wherein the phosphor-doped fluoroperovskite compound is selected from the group consisting of: $NaMgF_3:Eu^{2+}$; $NaMgF_3:Pr^{3+}$; $NaMgF_3:Tb^{3+}$; $NaMgF_3:Mn^{2+}$; $KMgF_3:Eu^{2+}$; $RbMgF_3:Eu^{2+}$; and $RbMgF_3:Ce^{3+}$.

11. A dosimeter for detecting ionizing radiation by TSL, comprising a phosphor-doped fluoroperovskite compound, wherein the compound stores at least part of the energy of incident ionizing radiation, and releases at least part of the stored energy upon heating, as claimed in claim 5.

12. A radiation storage device comprising a phosphor-doped fluoroperovskite compound, wherein the compound stores at least part of the energy of incident ionizing radiation, and releases at least part of the stored energy upon heating, as claimed in claim 5.

13. The dosimeter as claimed in claim 11 wherein the phosphor-doped fluoroperovskite compound is selected from the group consisting of: $NaMgF_3:Eu^{2+}$; $NaMgF_3:Pr^{3+}$; $NaMgF_3:Tb^{3+}$; $NaMgF_3:Mn^{2+}$; $KMgF_3:Eu^{2+}$; and $RbMgF_3:Mn^{2+}$;.

14. The radiation storage device as claimed in claim 12, wherein the phosphor-doped fluoroperovskite compound is selected from the group consisting of: $NaMgF_3:Eu^{2+}$; $NaMgF_3:Pr^{3+}$; $NaMgF_3:Tb^{3+}$; $NaMgF_3:Mn^{2+}$; $KMgF_3:Eu^{2+}$; and $RbMgF_3:Mn^{2+}$.

15. A method of determining a dose of ionizing radiation comprising:
   (a) providing a phosphor-doped fluoroperovskite compound, wherein the compound stores at least part of the energy of incident ionizing radiation, and releases at least part of the stored energy upon optical stimulation, as claimed in claim 1;
   (b) irradiating the phosphor-doped fluoroperovskite compound with ionizing radiation;
   (c) optically stimulating the irradiated phosphor-doped fluoroperovskite compound with a predetermined intensity of light comprising at least one predetermined wavelength;
   (d) measuring the intensity and duration of the optically stimulated luminescence from the irradiated phosphor-doped fluoroperovskite compound; and
   (e) relating, by calibration procedures, the intensity and duration of the optically stimulated luminescence to the dose of ionizing radiation absorbed by the phosphor-doped fluoroperovskite compound.

16. A method for recording and reproducing an ionizing radiation image comprising the steps of:
   (a) providing a phosphor-doped fluoroperovskite compound, wherein the compound stores at least part of the energy of incident ionizing radiation, and releasing at least part of the stored energy upon optical stimulation, as claimed in claim 1;
   (b) causing ionizing radiation to be incident upon the compound through an object to be imaged, so that the compound stores energy from the radiation;
   (c) exposing the compound to stimulating light to release the stored energy as emitted light;
   (d) detecting the emitted light for imaging.

17. The method as claimed in claim 15; wherein the phosphor-doped fluoroperovskite compound is selected from the group consisting of: $NaMgF_3:Eu^{2+}$; $NaMgF^3:Pr^{3+}$; $NaMgF^3:Tb^{3+}$; $NaMgF^3:Mn^{2+}$; $KMgF^3:Eu^{2+}$; $RbMgF^3:Eu^{2+}$; and $RbMgF^3:Ce^{3+}$.

18. The method as claimed in claim 16, wherein the phosphor-doped fluoroperovskite compound is selected from the group consisting of: $NaMgF_3:Eu^{2+}$; $NaMgF^3:Pr^{3+}$; $NaMgF^3:Tb^{3+}$; $NaMgF^3:Mn^{2+}$; $KMgF^3:Eu^{2+}$; $RbMgF^3:Eu^{2+}$; and $RbMgF^3:Ce^{3+}$.

19. A method of determining a dose of ionizing radiation comprising:
   (a) providing a phosphor-doped fluoroperovskite compound, wherein the compound stores at least part of the energy of incident ionizing radiation, and releases at least part of the stored energy upon heating, as claimed in claim 4;
   (b) irradiating the phosphor-doped fluoroperovskite compound with ionizing radiation;
   (c) heating the irradiated phosphor-doped fluoroperovskite compound in the dark;
   (d) measuring the intensity and duration of the luminescence from the irradiated phosphor-doped fluoroperovskite compound at a predetermined temperature or within a predetermined temperature range or during a predetermined temperature ramp; and
   (e) relating, by calibration procedures, the intensity and duration of the luminescence to the dose of ionizing radiation absorbed by the phosphor-doped fluoroperovskite compound.

20. A method for recording and reproducing an ionizing radiation image comprising the steps of:
   (a) providing a phosphor-doped fluoroperovskite compound, wherein the compound stores at least part of the energy of incident ionizing radiation, and releases at least part of the stored energy upon heating, as claimed in claim 4;
   (b) causing ionizing radiation to be incident upon the compound through an object to be imaged, so that the compound stores energy from the radiation;
   (c) exposing the compound to heat to release the stored energy as emitted light;
   (d) detecting the emitted light for imaging.

21. The method as claimed in claim 19, wherein the phosphor-doped fluoroperovskite compound is selected from the group consisting of: $NaMgF_3:Eu^{2+}$; $NaMgF_3:Pr^{3+}$; $NaMgF_3:Tb^{3+}$; $NaMgF_3:Mn^{2+}$; $RbMgF_3:Eu^{2+}$ and $RbMgF_3:Mn^{2+}$.

22. The method as claimed in claim 20, wherein the phosphor-doped fluoroperovskite compound is selected from the group consisting of: $NaMgF_3:Eu^{2+}$; $NaMgF_3:Pr^{3+}$; $NaMgF_3:Tb^{3+}$; $NaMgF_3:Mn^{2+}$; $RbMgF_3:Eu^{2+}$ and $RbMgF_3:Mn^{2+}$.

23. A method for preparing a phosphor-doped fluoroperovskite compound, wherein the phosphor-doped fluoroperovskite compound is selected from the group consisting of:

$NaMgF_3:Z^{d+}$ wherein $Z^{d+}$ is the dopant phosphor ion and is selected from the group consisting of: the transition Metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$;

$KMgF_3:Z^{d+}$ wherein $Z^{d+}$ is the dopant phosphor ion and is selected from the group consisting of: the transition metal ions: $Cu^+$; $Ag^+$; $Mn^{2+}$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Gd^{3+}$; and $Tb^{3+}$; and $Tl^+$; $In^+$; $Ga^+$; and $Pb^{2+}$; and $RbMgF_3:Z^{d+}$ wherein $Z^{d+}$ is the dopant phosphor ion and is selected from the group consisting of: the transition metal ions: $Cu^+$; $Ag^+$; $Mn^{3+}$; $Mn^{4+}$; and $Cr^{3+}$; the rare earth metal ions: $Eu^{2+}$; $Sm^{2+}$; $Sm^{3+}$; $Pr^{3+}$; $Ce^{3+}$; $Gd^{3+}$; and $Tb^{3+}$; and $Tl^+$; $In^+$; $Ga^+$; and $Pb^{2+}$;

and mixtures of any two or more thereof, and wherein the phosphor-doped fluoroperovskite compound stores at least part of the energy of incident ionizing radiation, and releases at least part of the stored energy upon optical stimulation or upon heating, the method comprising the steps:
   (a) providing a mixture of precursor compounds;
   (b) heating the mixture to a temperature at or above the melting point of the mixture to form a homogenous melt, or heating the mixture to a temperature below the melting point of the mixture and sintering the mixture; and
   (c) cooling the melt to provide the phosphor-doped fluoroperovskite compound.

24. The method, as claimed in claim 23, wherein step (c) comprises cooling the melt to a temperature below the melting point of the phosphor-doped fluoroperovskite compound and then quenching the compound.

25. The method, as claimed in claim 23, wherein step (c) comprises quenching the melt or quenching the sintered mixture.

26. The method, as claimed in claim 23, wherein one or both of steps (b) and (c) are carried out in an atmosphere having a low oxygen partial pressure.

27. The method, as claimed in claim 23, further comprising the steps:
   (d) grinding the phosphor-doped fluoroperovskite compound;
   (e) sintering the ground compound at a temperature below the melting point of the compound; and
   (f) cooling the sintered phosphor-doped fluoroperovskite compound.

28. The method as claimed in claim 27, wherein step (f) comprises quenching the sintered phosphor-doped fluoroperovskite compound.

29. The method as claimed in claim 23, wherein the phosphor-doped fluoroperovskite compound is selected from the group consisting of: $NaMgF_3:Eu^{2+}$; $NaMgF^3:Pr^{3+}$; $NaMgF^3:Tb^{3+}$; $NaMgF^3:Mn^{2+}$; $KMgF^3:Eu^{2+}$; $RbMgF_3:Eu^{2+}$; and $RbMgF_3:Ce^{3+}$.

* * * * *

UNITED STATES PATENT AND TRADEMARK OFFICE
CERTIFICATE OF CORRECTION

PATENT NO. : 8,563,949 B2  Page 1 of 1
APPLICATION NO. : 12/452490
DATED : October 22, 2013
INVENTOR(S) : Dotzler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 490 days.

Signed and Sealed this

Fifteenth Day of September, 2015

Michelle K. Lee
*Director of the United States Patent and Trademark Office*